US012717199B2

(12) United States Patent
Mei et al.

(10) Patent No.: US 12,717,199 B2
(45) **Date of Patent: *Aug. 25, 2026**

(54) ELECTROCHROMIC DEVICES HAVING N-DOPED CONDUCTIVE POLYMER AS TRANSPARENT CONDUCTING LAYER, ION STORAGE LAYER, AND/OR ELECTROCHROMIC LAYER

(71) Applicant: AMBILIGHT INC., Grand Cayman (KY)

(72) Inventors: Jianguo Mei, West Lafayette, IN (US); Ashkan Abtahi, West Lafayette, IN (US)

(73) Assignee: Ambilight Inc., Grand Cayman (KY)

( * ) Notice: Subject to any disclaimer, the term of this patent is extended or adjusted under 35 U.S.C. 154(b) by 471 days.

This patent is subject to a terminal disclaimer.

(21) Appl. No.: 18/099,850

(22) Filed: Jan. 20, 2023

(65) Prior Publication Data

US 2024/0160075 A1 May 16, 2024

Related U.S. Application Data

(63) Continuation-in-part of application No. PCT/US2022/048711, filed on Nov. 2, 2022.

(51) Int. Cl.

*G02F 1/157* (2006.01)
*C08G 61/12* (2006.01)
*G02F 1/1516* (2019.01)

(52) U.S. Cl.

CPC ........... *G02F 1/157* (2013.01); *C08G 61/126* (2013.01); *G02F 1/15165* (2019.01);
(Continued)

(58) Field of Classification Search

CPC ........ G02F 1/15; G02F 1/155; G02F 1/15165; G02F 1/163; G02F 1/1514; G02F 1/1516; G02F 1/1533; G02F 1/153; G02F 1/157; G02F 1/1525; G02F 1/1523; G02F 1/1508; G02F 2202/16; C08G 61/126; C08G 2261/11; C08G 2261/122;
(Continued)

(56) References Cited

U.S. PATENT DOCUMENTS 6,795,226 B2 9/2004 Agrawal et al.
12,164,209 B2 * 12/2024 Mei ...................... C09D 161/02
(Continued)

FOREIGN PATENT DOCUMENTS

EP 4365262 A1 5/2024
WO 2005084350 A2 9/2005
(Continued)

OTHER PUBLICATIONS

Written Opinion of the International Searching Authority and International Search Report for PCT Application No. PCT/ US2022/ 048711 mailed on Feb. 8, 2023 (27 pages).
(Continued)

*Primary Examiner* — Jie Lei
(74) *Attorney, Agent, or Firm* — Dickinson Wright PLLC

(57) ABSTRACT

This disclosure presents electrochromic devices that incorporate an n-doped organic conductive polymer, which can function as a transparent conductor, and/or ion storage material, and/or an electrochromic material in the electrochromic devices.

20 Claims, 18 Drawing Sheets

(52) U.S. Cl.
CPC .... *C08G 2261/11* (2013.01); *C08G 2261/122* (2013.01); *C08G 2261/124* (2013.01); *C08G 2261/3246* (2013.01); *C08G 2261/3247* (2013.01); *C08G 2261/514* (2013.01); *G02F 2202/16* (2013.01)

(58) Field of Classification Search
CPC ...... C08G 2261/124; C08G 2261/3246; C08G 2261/3247; C08G 2261/514; C08G 2261/1424; C08G 2261/1426; C08G 2261/3223; C08G 2261/334; C08G 2261/794; C08G 61/12; B32B 17/06; B32B 27/08; B32B 27/36; B32B 37/24; B32B 2250/02; B32B 2255/10; B32B 2255/26; B32B 2255/28; B32B 2307/202; B32B 2307/412; B32B 2457/20; B32B 2037/243; C07D 519/00; C09D 165/00; C09K 11/06
USPC ................ 359/265, 266, 270, 271, 273, 900
See application file for complete search history.

(56) References Cited

U.S. PATENT DOCUMENTS

| | | | |
|---|---|---|---|
| 2005/0200935 | A1 | 9/2005 | Liu et al. |
| 2020/0387040 | A1 | 12/2020 | He et al. |
| 2021/0141281 | A1 | 5/2021 | Trajkovska-Broach et al. |
| 2021/0232014 | A1 | 7/2021 | Mei et al. |
| 2023/0312785 | A1 | 10/2023 | Huang et al. |

FOREIGN PATENT DOCUMENTS

| | | | |
|---|---|---|---|
| WO | 2017148864 | A1 | 9/2017 |
| WO | 2020/018621 | A1 | 1/2020 |
| WO | 2020/051419 | A1 | 3/2020 |

OTHER PUBLICATIONS

The extended European search report issued for European Application No. 24152993.2, dated Jun. 11, 2024, 8 pages.
The extended European search report issued for European Application No. 24152973.4, dated Jun. 11, 2024, 7 pages.

* cited by examiner

1300

ELECTROCHROMIC DEVICES HAVING N-DOPED CONDUCTIVE POLYMER AS TRANSPARENT CONDUCTING LAYER, ION STORAGE LAYER, AND/OR ELECTROCHROMIC LAYER

CROSS-REFERENCE TO RELATED APPLICATIONS

This application is a Continuation-In-Part application of International Application No. PCT/US2022/048711, filed on Nov. 2, 2022. The entire content of the above application is incorporated herein by reference in its entirety.

FIELD OF THE INVENTION

The present invention is related to electrochromic devices having an n-doped organic conductive polymer, which can serve as a transparent conducting layer, or/and a ion storage layer, or/and an electrochromic layer.

BACKGROUND

An electrochromic device (ECD) typically consists of seven layers, including, two non-conductive layers as substrates, one or two transparent conducting (TC) layers, an electrochromic layer as a working electrode (WE), an ion storage layer as a counter electrode (CE), and an electrolyte layer. The electrochromic layer undergoes a color changing when an external electrical bias is applied. Meanwhile, the ion storage layer undergoes opposite reactions to the one in the electrochromic layer to balance the charge generated at the electrochromic layer. Between an electrochromic layer and an ion storage layer is an electrolyte layer that functions as the ion source and ion conduction channel. The electrochromic and ion storage layers are disposed on transparent conductors, which is the current collector for the device. When two transparent conductor layers are chosen, the device functions as a transmissive device. While one layer of transparent conductor is used (e.g., the other conducting layer is a reflective conducting layer), it typically functions as a reflective device. The most used TC layer in ECDs is indium tin oxide (ITO) because of its low sheet resistance, high optical transparency, and sufficiently large voltage window for most EC materials. However, ITO is mechanically fragile with a small bending radius and strain that limits its application in roll-to-roll manufacturing and flexible electronics. In addition, indium is a rare earth mineral, which has a scarce mineral reserve. With the increasing demand of ITO, indium availability will become highly constrained within two decades and a soaring price has been witnessed in recent years. Thus, it is highly desired to find ITO alternatives that offer high performance as well as low cost, and it is further appreciated to reduce layers of the ECDs to simplify device structures to further lower the cost. Further, solution-processable minimally color-changing transmissive ion storage materials are also desired to pair up with electrochromic materials for improved performance and durability.

SUMMARY

The present disclosure is related to electrochromic devices that comprise an n-doped organic conductive polymer.

In one aspect, the disclosed electrochromic device includes a first insulating substrate; a first conducting layer disposed over the first insulating substrate, an ion storage layer disposed over the first conducting layer, an electrolyte layer disposed over the ion storage layer, an electrochromic layer disposed over the electrolyte layer, a second conducting layer disposed over the electrochromic layer, and a second insulating substrate disposed over the second conducting layer. In this electrochromic device, the first conducting layer or the second conducting layer or the ion storage layer or any combination thereof comprises an n-doped organic conductive polymer with the formula of

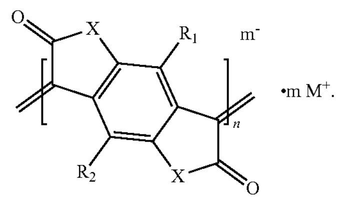

In this formula, X is O, S, or Se; each of m and n is an integer greater than zero; each of $R_1$ and $R_2$ is independently selected from one of hydrogen or $C_1$-$C_{10}$ alkyl; $M^+$ is a cation. In some embodiments, X is O, each of $R_1$ and $R_2$ is hydrogen, and $M^+$ is a proton. In some embodiments, the first conducting layer or the second conducting layer or the ion storage layer or any combination of the first conducting layer and the second conducting layer and the ion storage layer consists of the disclosed n-doped organic conductive polymer. In some embodiments, both the first conducting layer and the ion storage layer comprise the disclosed n-doped organic conductive polymer and are integrated into one single layer.

Both inorganic and organic electrochromic materials may be used in the electrochromic layer in the electrochromic device disclosed herein. In some embodiments, the electrochromic layer in the electrochromic device disclosed herein includes one or more of $WO_3$, NiO, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. Different types of electrolyte materials (e.g., liquid electrolyte, gel electrolyte, or solid electrolyte) may be used in the electrolyte layer in the electrochromic device disclosed herein. In some embodiments, the electrolyte layer in the electrochromic device disclosed herein includes a solid electrolyte or a gel electrolyte. Both inorganic and organic ion storage materials may be used in the ion storage layer in the electrochromic device disclosed herein. In some embodiments, when the ion storage layer does not include the disclosed n-doped organic conductive polymer, the ion storage layer in the electrochromic device disclosed herein includes one or more oxides of metal elements in Group 4-12, or a mixture of the oxides, or one of the oxides doped by any other metal oxides. In some embodiments, at least one of the first conducting layer and the second conducting layer is transparent. In some embodiments, both the first conducting layer and the second conducting layer are transparent. In some embodiments, the first conducting layer or the second conducting layer comprises a reflective conducting layer.

In another aspect, the disclosed electrochromic device includes a first insulating substrate; a first conducting layer disposed over the first insulating substrate, a first electrochromic layer disposed over the first conducting layer and comprising an n-doped organic conductive polymer with the formula of

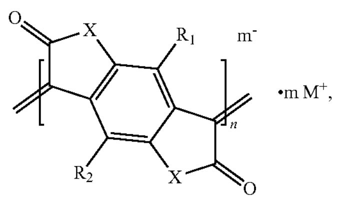

an electrolyte layer disposed over the first electrochromic layer, a second electrochromic layer disposed over the electrolyte layer comprising a p-doped electrochromic material, a second conducting layer disposed over the second electrochromic layer, and a second insulating substrate disposed over the second conducting layer. In this formula, X is O, S, or Se; each of m and n is an integer greater than zero; each of $R_1$ and $R_2$ is independently selected from one of hydrogen or $C_1$-$C_{10}$ alkyl; $M^+$ is a cation. In some embodiments, X is O, each of $R_1$ and $R_2$ is hydrogen, and $M^+$ is a proton. In some embodiments, the first electrochromic layer disposed over the first conducting layer consists of the disclosed n-doped organic conductive polymer.

Both inorganic and organic p-doped electrochromic materials may be used in the second electrochromic layer in the electrochromic device disclosed herein. In some embodiments, the p-doped electrochromic material in the electrochromic device disclosed herein includes one or more NiO, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. In some embodiments, the p-doped electrochromic material is a p-doped electrochromic polymer. Different types of electrolyte materials (e.g., liquid electrolyte, gel electrolyte, or solid electrolyte) may be used in the electrochromic layer in the electrochromic device disclosed herein. In some embodiments, the electrolyte layer in the electrochromic device disclosed herein includes a solid electrolyte or a gel electrolyte.

In some embodiments, one of the first conducting layer or the second conducting layer comprises an inorganic conductive material. In some embodiments, the inorganic conductive material comprises indium tin oxide or a metal. In some embodiments, at least one of the first conducting layer or the second conducting layer is transparent. In some embodiments, both of the first conducting layer and the second conducting layer are transparent. In some embodiments, the first conducting layer or the second conducting layer are reflective and includes a reflective conducting material.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized. The accompanying drawings include:

FIG. 3(A) is a schematic illustration of the 3-electrode electrochromic device, according to one example embodiment. FIG. 3(B) is the cross-sectional view of the working electrode in FIG. 3(A).

FIG. 5(A) is cyclic voltammograms of 30 nm thick n-BDF thin film at different rates on ITO in 0.2M Tetrabutylammonium-bis-trifluoromethanesulfonimidate (TBATFSI) in propylene carbonate (PC). FIG. 5(B) illustrates averaged current density at 0.3 V (vs. Ag/AgCl) plotted vs scan rate.

FIG. 7(A) is the spectro-electrochemistry at colored and bleached states and FIG. 7(B) depicts the switching kinetics from stepwise potential fast chronoamperometry (SPFC), according to one example embodiment.

FIG. 9(A) is the spectro-electrochemistry at colored and bleached states and FIG. 9(B) depicts the switching kinetics from SPFC, according to one example embodiment.

FIG. 10(A) is the spectro-electrochemistry at colored and bleached states and FIG. 10(B) depicts the switching kinetics from SPFC, according to one example embodiment.

FIG. 11(A) is the spectro-electrochemistry at colored and bleached states and FIG. 11(B) depicts the switching kinetics from SPFC, according to one example embodiment.

FIG. 14(A) the spectro-electrochemistry at colored and bleached states and FIG. 14(B) depicts the switching kinetics from SPFC, according to one example embodiment.

DETAILED DESCRIPTION OF EMBODIMENTS

Figure 1:
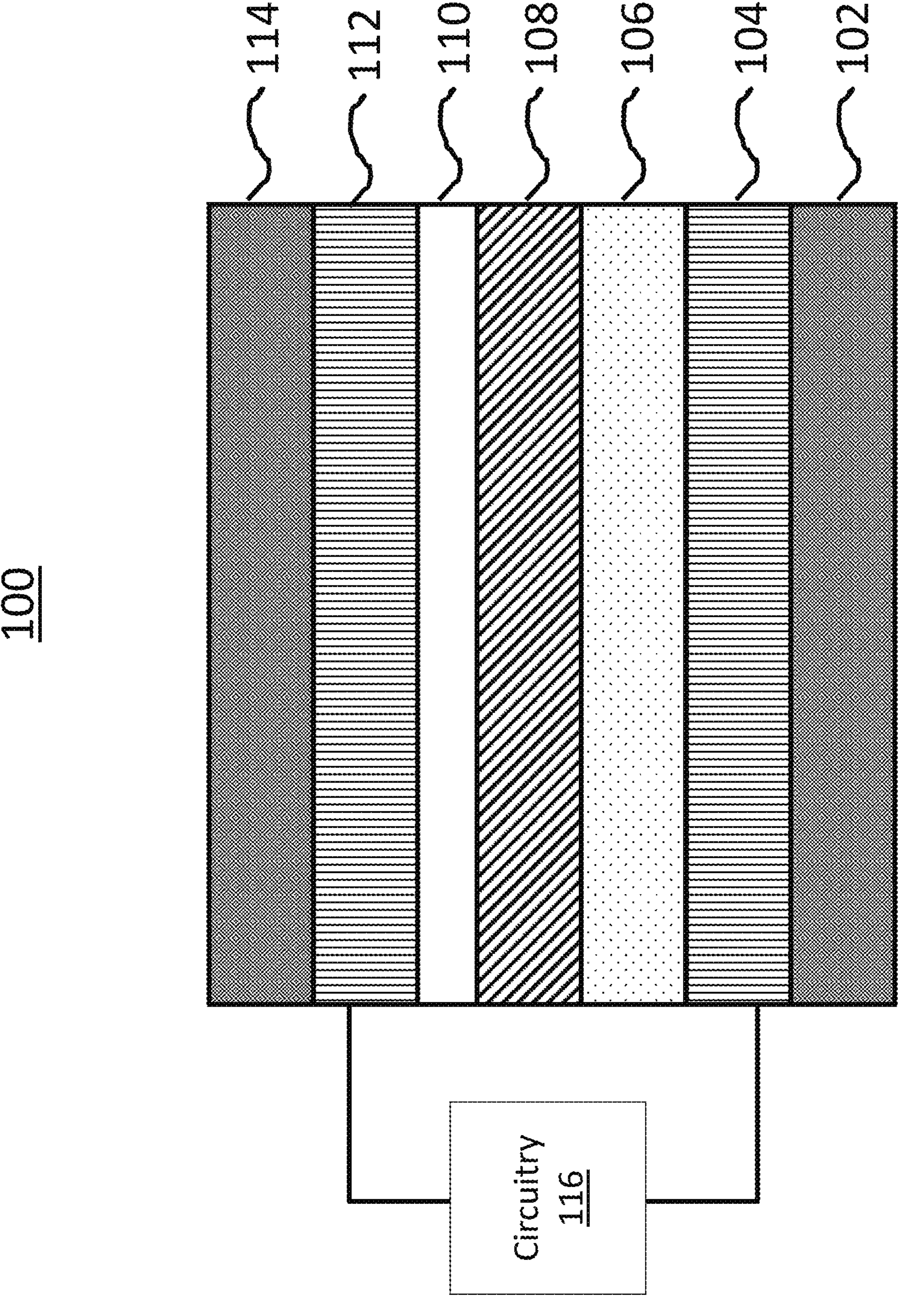
FIG. 1 depicts a cross-section view of an electrochromic device that includes a layer of the disclosed n-doped organic conductive polymer functioning as a transparent conducting layer, according to one example embodiment of the present disclosure.

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to electrochromic devices that comprise an n-doped organic conductive polymer with the formula of

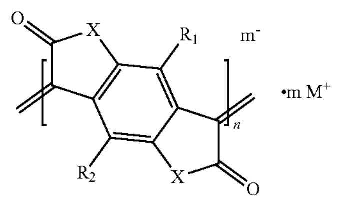

In this formula, X is O, S, or Se; each of m and n is an integer greater than zero; each of $R_1$ and $R_2$ is independently selected from one of hydrogen or $C_1$-$C_{10}$ alkyl; $M^+$ is a cation. In some embodiments, X is O, each of $R_1$ and $R_2$ is hydrogen, and $M^+$ is a proton and the n-doped organic conductive polymer according to these embodiments is called n-PBDF. A layer including the disclosed n-doped organic conductive polymer may function as a transparent conducting (TC) layer, and/or an ion storage layer, and/or an electrochromic layer. Three specific electrochromic polymers are used throughout this specification for example purposes. It is to be understood that this disclosure is not limited to these examples. ECP-Magenta (ECP-M) is an example magenta-colored ECP. ECP-Blue (ECP-B) is an example blue-colored ECP. ECP-Black (ECP-BK) is an example black-colored ECP. Structures of the example ECP-M, ECP-B, and ECP-BK are shown in the following below, respectively, where n is an integer greater than zero.

ECP-M

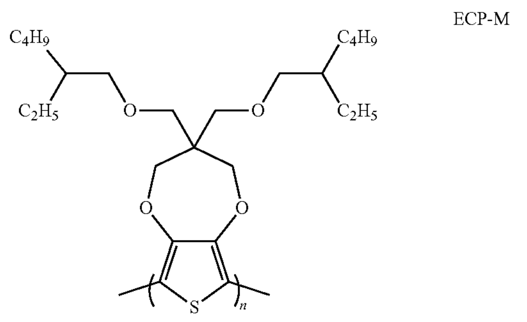

-continued

ECP-B

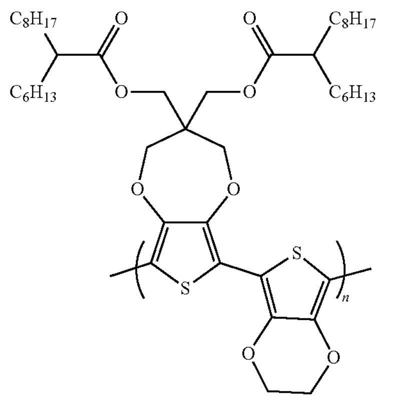

ECP-BK

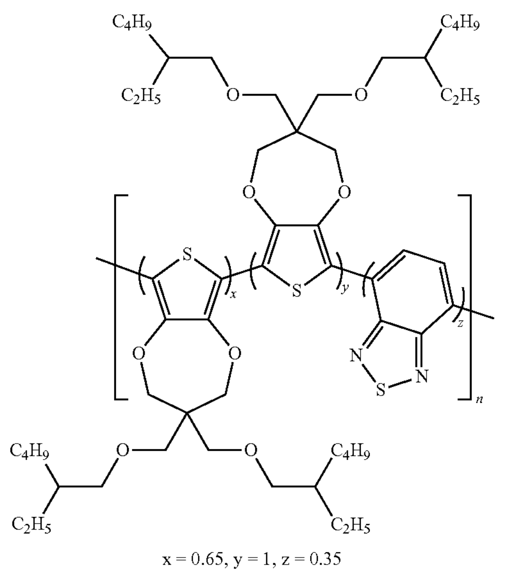

x = 0.65, y = 1, z = 0.35

A conventional ECD consists of seven layers, including, two non-conductive layers as substrates, one or two transparent conducting (TC) layers (one for a working electrode and one for a counter electrode) disposed on the substrates respectively, an electrochromic layer as a working electrode (WE), an ion storage layer as a counter electrode (CE), and an electrolyte layer interposed between the WE and CE. In the present disclosure, a layer including the disclosed n-doped organic conductive polymer can serve as a TC layer, or/and an ion storage layer, or/and an electrochromic layer. In some embodiments, the disclosed n-doped organic conductive polymer can replace traditional ITO to be great transparent conductor and a layer including the disclosed n-doped organic conductive polymer can function as at least one of the TC layers in an ECD. In some embodiments, a layer including the disclosed n-doped organic conductive polymer can function as the ion storage layer in an ECD. In some embodiments, a layer including the disclosed n-doped organic conductive polymer can function as both the TC layer for the counter electrode and the ion storage layer separately. In some embodiments, a layer including the disclosed n-doped organic conductive polymer can function as both the TC layer for the counter electrode and the ion storage layer simultaneously (e.g., integrated as one single layer), such that the layers are reduced, simplifying the electrochromic device structure. In some embodiments, a layer including the disclosed n-doped organic conductive polymer can function as the ion storage layer for the counter electrode and the TC layer for the working electrode separately. In some embodiments, a layer including the disclosed n-doped organic conductive polymer can function as both the TC layer for the counter electrode and the ion storage layer simultaneously (e.g., integrated as one single layer) and the TC layer for the working electrode, such that the layers are reduced, simplifying the electrochromic device structure. In some embodiments, a layer including the disclosed n-doped organic conductive polymer can function as both the TC layer for the counter electrode and the ion storage layer separately and the TC layer for the working electrode. In some embodiments, a layer including the disclosed n-doped organic conductive polymer can conduct a redox reaction to exhibit electrochromic properties to function as an electrochromic layer (as a counter electrode, to replace the conventional ion storage layer) to be paired with the electrochromic layer including a p-doped electrochromic material as a working electrode. In some embodiments, the disclosed ECD comprises a layer consisting of the disclosed n-doped organic conductive polymer. When a layer including the disclosed n-doped organic conductive polymer functioning as a TC layer and/or an ion storage layer might include, beside the disclosed n-doped organic conductive polymer, other components which will not significantly affect the layer's optical properties and electrical conductivity, such as electrolyte salts, (e.g. $Li^+$ salt, $Na^+$ salt, $TBA^+$ (tetrabutylammonium)) or some stabilizers to adjust its mechanical properties (e.g. PEG (polyethylene glycol), polystyrene). When a layer including the disclosed n-doped organic conductive polymer functioning as an electrochromic layer might include, beside the disclosed n-doped organic conductive polymer, other components which will not significantly affect the layer's optical properties and electrical conductivity, such as electrolyte salts, (e.g. $Li^+$ salt, $Na^+$ salt, $TBA^+$ (tetrabutylammonium)) or some stabilizers to adjust its mechanical properties (e.g. PEG (polyethylene glycol), polystyrene), or some other n-doped electrochromic materials, such as $WO_3$, viologen, or n-doped electrochromic polymers. A p-doped electrochromic material means the material undergoes an electrochromic process when being oxidized. A n-doped electrochromic materials means the material undergoes an electrochromic process when being reduced.

In the present disclosure, the disclosed n-doped organic conductive polymer shows low sheet resistance, high optical transparency and large voltage window for most EC materials, which makes the disclosed n-doped organic conductive polymer an organic transparent conductor for ECDs. Besides that, the disclosed n-doped organic conductive polymer is mechanically flexible and can be easily applied to roll-to-roll manufacturing and flexible ECDs, which rivals traditional transparent conductor ITO. In an ECD disclosed in the present disclosure, when a layer including the disclosed n-doped organic conductive polymer functions as both the ion storage layer and the TC layer for the counter electrode simultaneously, the ECD structure can be simplified, thus can be manufactured with less cost and improved throughput. Therefore, the disclosed techniques can provide high performance ECDs with a lower cost.

In one aspect, the disclosed electrochromic device comprises a layer including the disclosed n-doped organic conductive polymer which does not go through a redox reaction and remains transparent within the applied device voltage window. There are three main different types of disclosed electrochromic device configurations. Each example configuration from each type is shown and discussed as follow.

The first type of the disclosed electrochromic device has at least one of the TC layers including the disclosed n-doped organic conductive polymer. As shown in FIG. 1, such example configuration may have a first insulating substrate 102, a first conducting layer 104 comprising the disclosed n-doped organic conductive polymer disposed over the first insulating substrate 102, an ion storage layer 106 disposed on the first conducting layer 104, an electrolyte layer 108 disposed over the ion storage layer 106, an electrochromic layer 110 disposed over the electrolyte layer 108, a second conducting layer 112 disposed over the electrochromic layer 110, a second insulating substrate 114 disposed over the second conducting layer 112, and circuitry 116 to operate the electrochromic device 100. In some embodiments, at least one of the first conducting layer or the second conducting layer is transparent (When the conducting layer is transparent, it is called a TC layer.). In some embodiments, both of the first conducting layer and the second conducting layer are transparent (For these disclosed ECDs, they have two TC layers.). In some embodiments, the first conducting layer or the second conducting layer comprises a reflective conducting layer, such as a metal layer, to form a reflective ECD. In some embodiments, the first conducting layer 104 may include a transparent conductor (e.g. ITO) without the disclosed n-doped organic conductive polymer while the second conducting layer 112 includes the disclosed n-doped organic conductive polymer. In some embodiments, both the first conducting layer 104 and the second conducting layer 112 include the disclosed n-doped organic conductive polymer. In some embodiments, at least one of the first conducting layer 104 and the second conducting layer 112 consists of the disclosed n-doped organic conductive polymer.

Figure 2A:
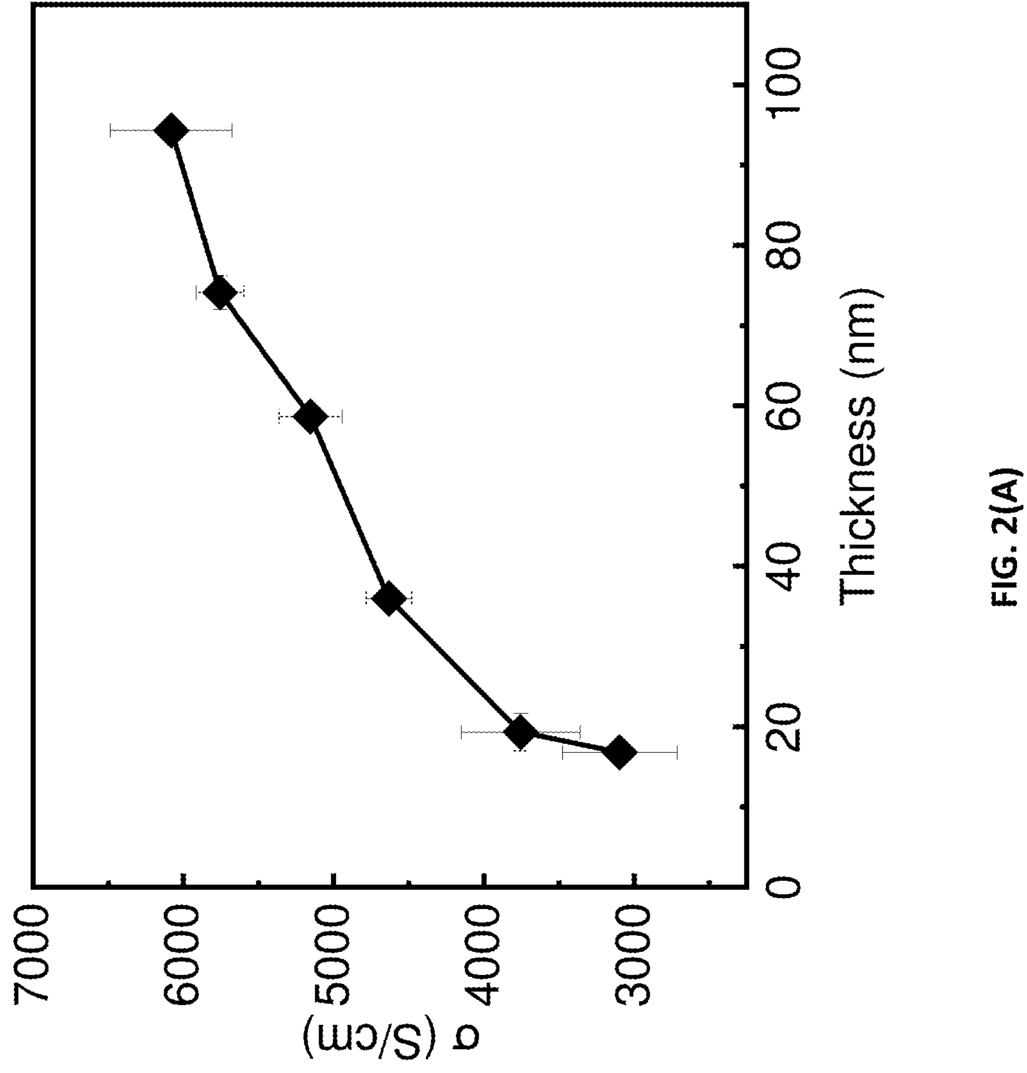
FIGS. 2(A)-(C) are diagrams containing the electrical conductivity (FIG. 2(A)), transmittance (FIG. 2(B)) and sheet resistance and transmittance at 550 nm (FIG. 2(C)) of an example n-doped organic conductive polymer n-PBDF thin films at different thicknesses, according to some example embodiments.
Figure 2B:
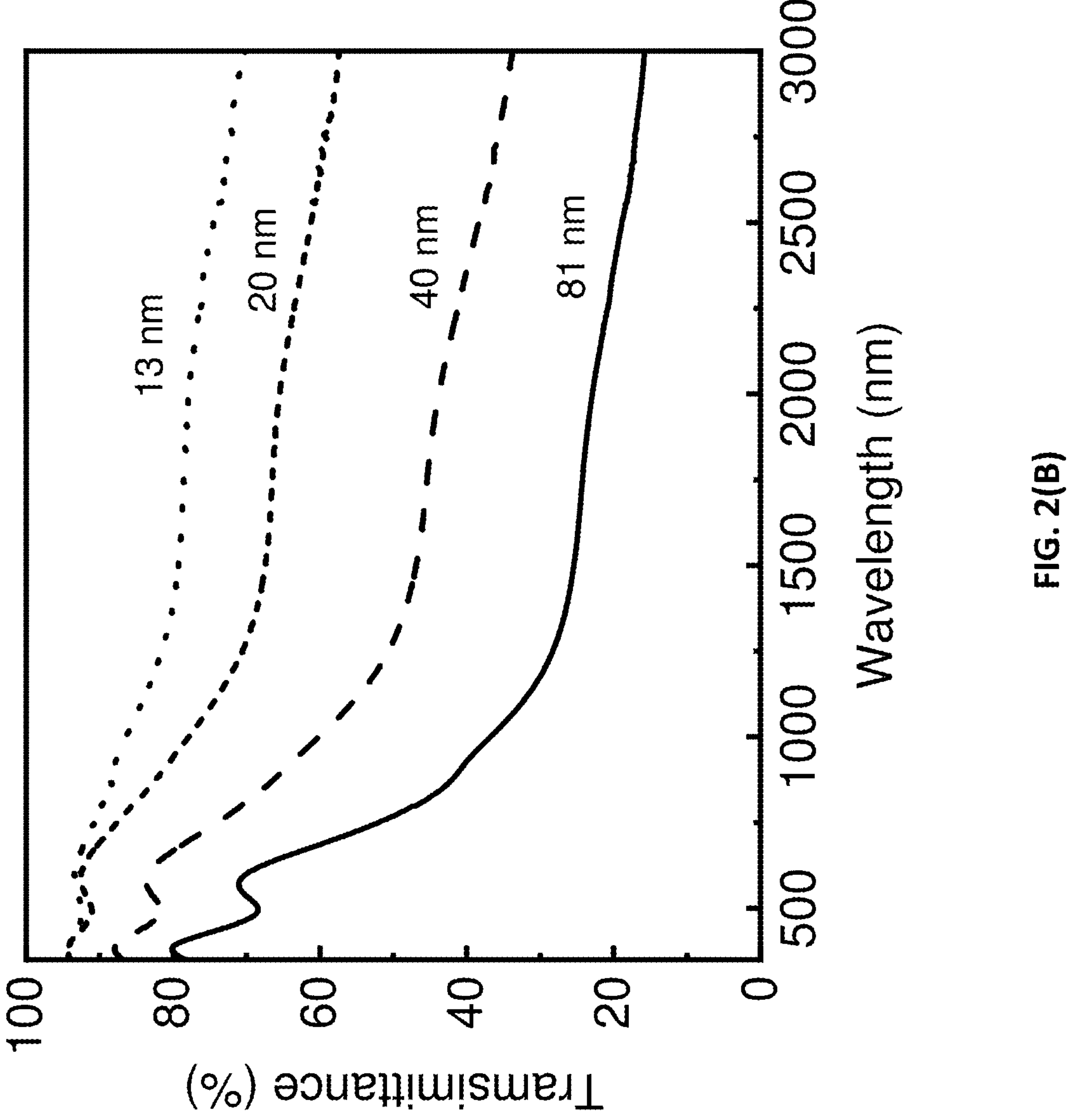
Figure 2C:
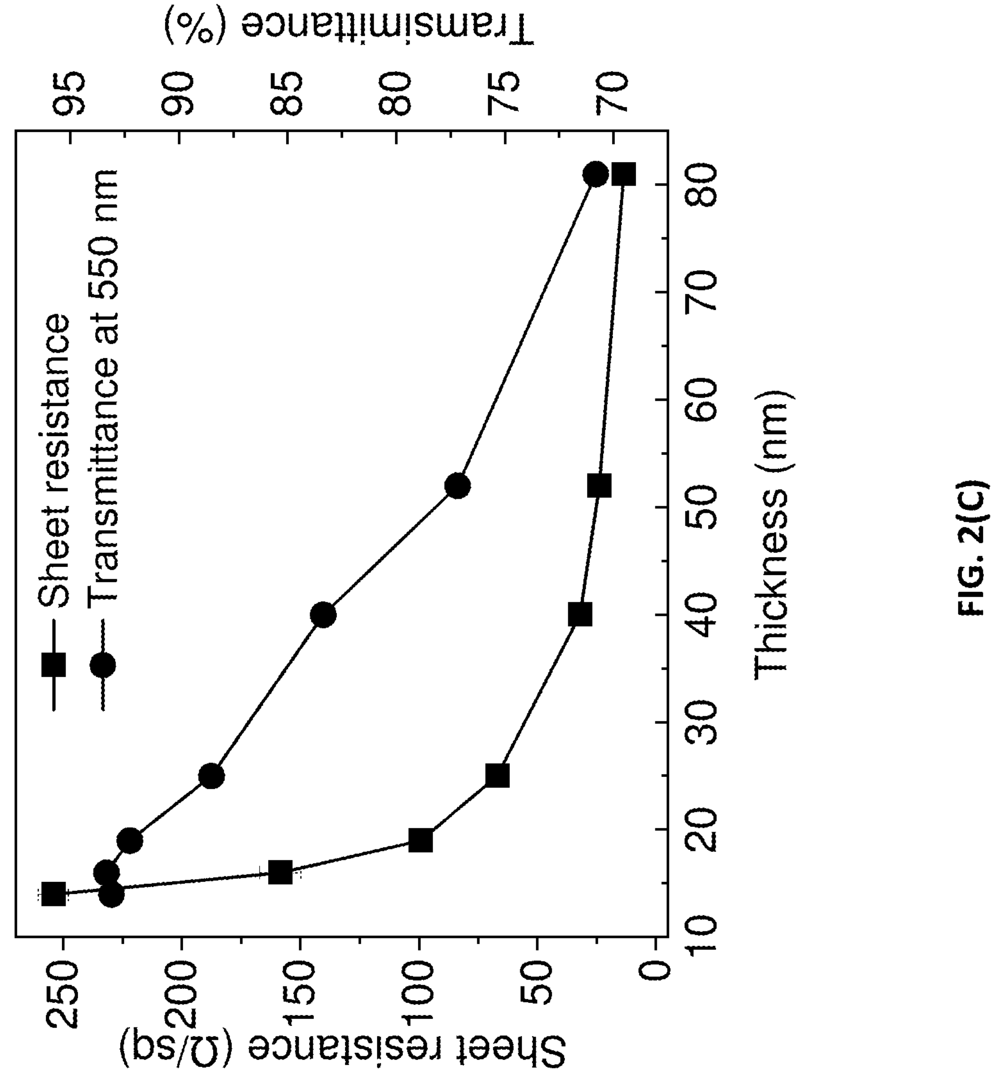

The disclosed n-doped organic conductive polymer can function as a high-performance transparent conductor. To demonstrate it, n-PBDF is used as an example n-doped organic conductive polymer and its optical transmittance, electrical conductivity and sheet resistance at various thicknesses are investigated. FIG. 2(A) is a diagram showing the conductivity of the thin films with thickness ranging from 16 nm to 94 nm. The conductivity of the thin films increases as the film thickness increases. It reaches 6100 S/cm around the thickness of 94 nm. Optical transmittance of n-PBDF thin films is depicted in FIG. 2(B). As shown in FIG. 2(B), the n-PBDF thin films show a high transmittance in the visible region (e.g., 400-700 nm). High conductivity and transmittance in the visible region of the thin films indicate that the disclosed n-doped organic conductive polymer is suitable to be used as a transparent conductor. This is further evident in FIG. 2(C) where sheet resistance and optical transmittance are plotted with film thickness. At 550 nm wavelength which human eye is the most sensitive to, the optimized n-PBDF thin film exhibits low sheet resistance of 45 Ω/sq and high transmittance ($T_{550}$>80%) which can rival traditional transparent conductor ITO. Thus, the disclosed n-doped organic conductive polymer is established as a high-performance transparent conductor.

Figure 3B:
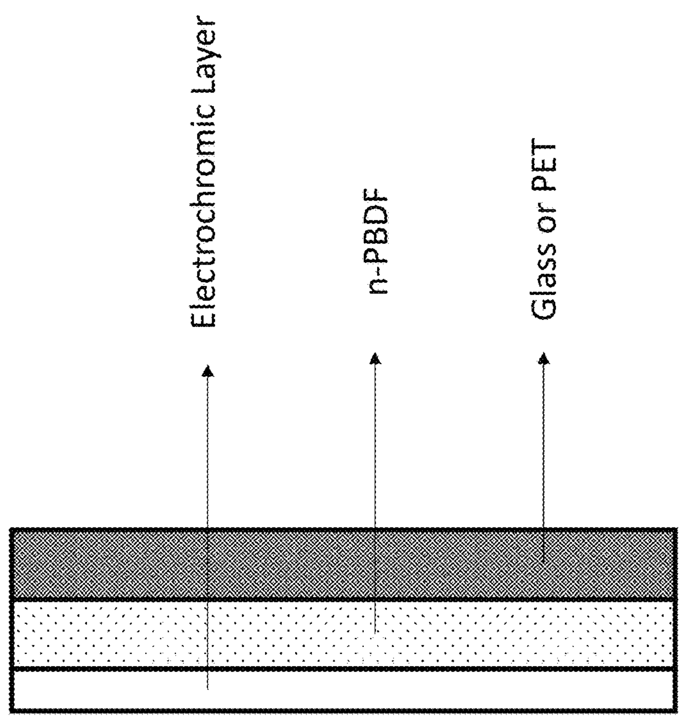
FIGS. 3(A)-(B) depict example designs of a 3-electrode electrochromic device including a layer of an example n-doped organic conductive polymer n-PBDF functioning as the TC layer of the electrochromic device.
Figure 3A:
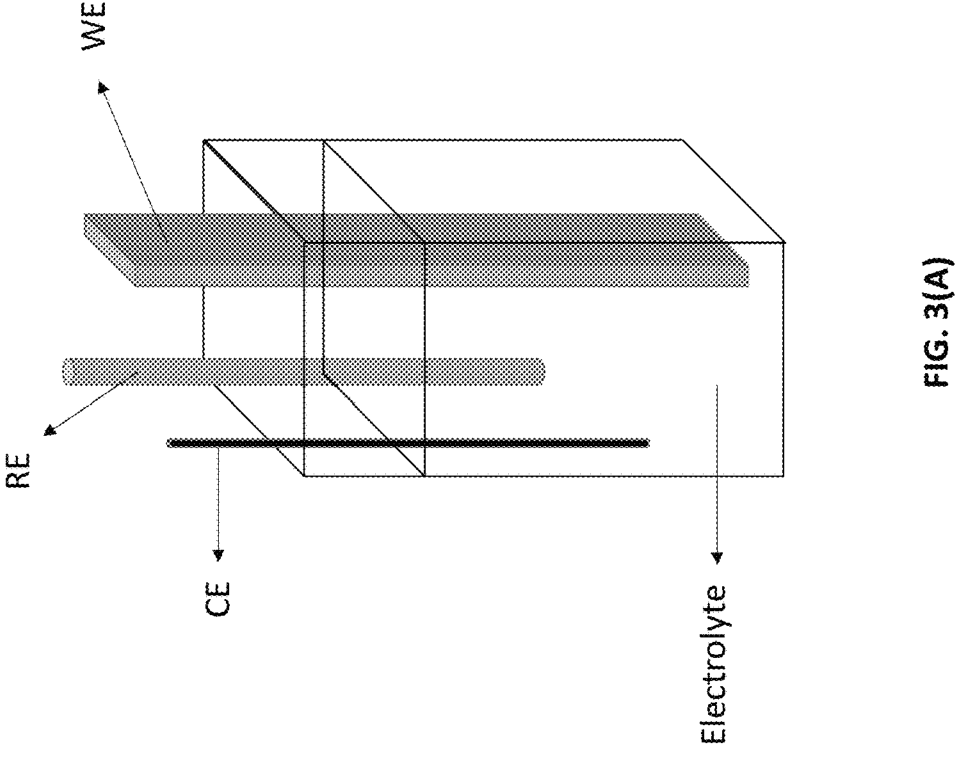
Figure 4B:
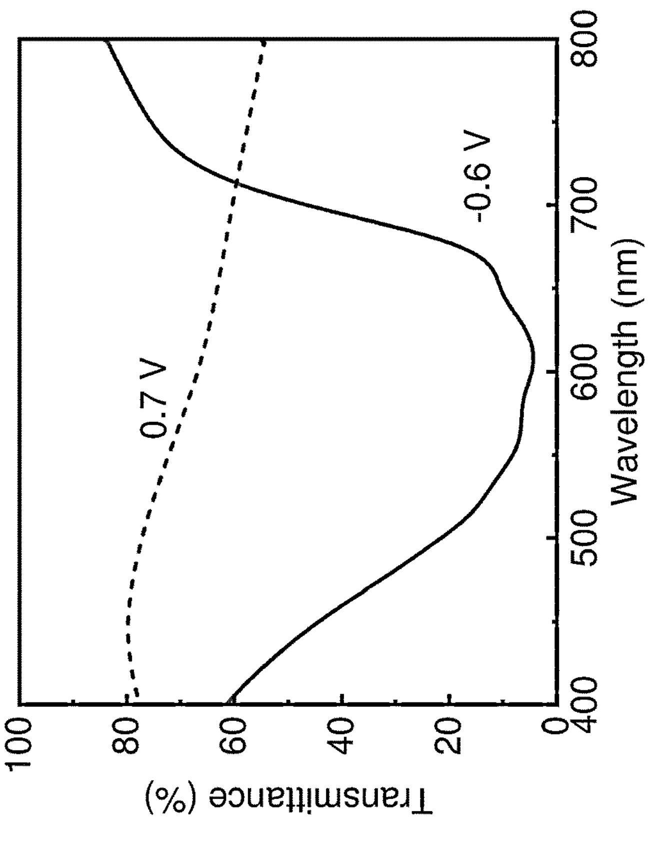
FIGS. 4(A)-(B) are diagrams containing cyclic voltammograms of electrochromic polymer (ECP)-B on ITO/substrate and on an example n-doped organic conductive polymer n-PBDF/substrate, and cyclic voltammograms of n-PBDF on a platinum button electrode (FIG. 4(A)), and the spectro-electrochemistry of ECP-B on n-PBDF/substrate (FIG. 4(B)).
Figure 4A:
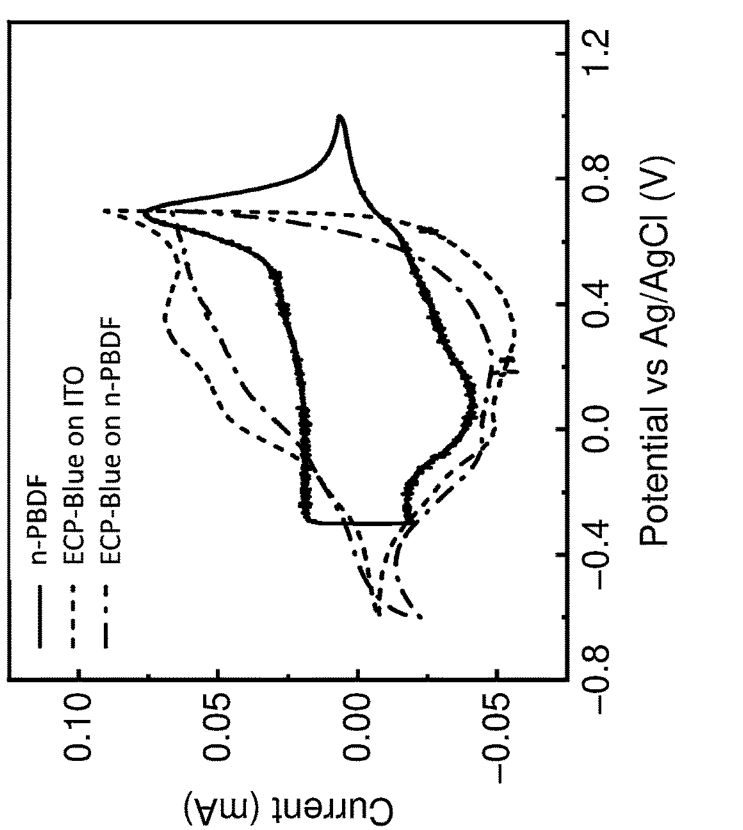

To simplify the demonstration of the disclosed n-doped organic conductive polymer functioning as a TC layer in an ECD, a 3-electrode electrochromic device 300 is adopted. As shown in schematic illustration in FIG. 3(A), the ECD 300 disclosed here includes a counter electrode (e.g., Pt) CE, a reference electrode (e.g., Ag/AgCl) RE, and a working electrode WE. As shown in a diagram illustrating a cross-section view of the working electrode WE in FIG. 3(B), the working electrode WE includes a piece of glass or PET as substrate, a layer of the disclosed n-doped organic conductive polymer as the transparent conductor, and a layer of electrochromic material (e.g., ECP-B) as the electrochromic layer. In one embodiment, a layer of the example n-doped organic conductive polymer n-PBDF with $T_{550}$ (transmittance at wavelength 550 nm)>85% and a $R_s$ (sheet resistance)<80 Ω/sq is first coated on a bare glass substrate, followed by an electrochromic layer, such as ECP-B. The glass slide is then immersed in a liquid electrolyte to set up a 3-electrode electrochromic device. In one embodiment, upon applying a positive potential up to 0.7 V (vs. Ag/AgCl), the ECP-B is gradually oxidized and becomes transmissive. This process is captured in spectro-electrochemical measurements of the ECP-B on n-PBDF/substrate structure as shown in FIG. 4(B). As the applied voltage increases, the transmittance of ECP-B in the visible region (e.g., 400-700 nm) increases. The same measurement is performed when ITO is used as a transparent electrode and a very similar electrochromic response is recorded. The CV measurement results for ECP-B on ITO/substrate, ECP-B on n-PBDF/substrate, and n-PBDF itself taken on a platinum button working electrode are shown in FIG. 4(A), ECP-B electrochromic layer shows ECP-B has the same oxidation onset on both ITO and n-PBDF transparent conductors at around −0.2 V (vs Ag/AgCl), which is about 0.8 V lower than the oxidation onset of n-PBDF (0.58 V vs Ag/AgCl). Thus, when the voltage applied to n-PBDF is lower than 0.58V, n-PBDF does not go through a redox reaction. Overall, these results demonstrate that the disclosed n-doped organic conductive polymer can be used as an TC layer in electrochromic devices without negatively affecting the optical and electrical property of the electrochromic devices and comparable to the inorganic TC (e.g., ITO).

Figure 5A:
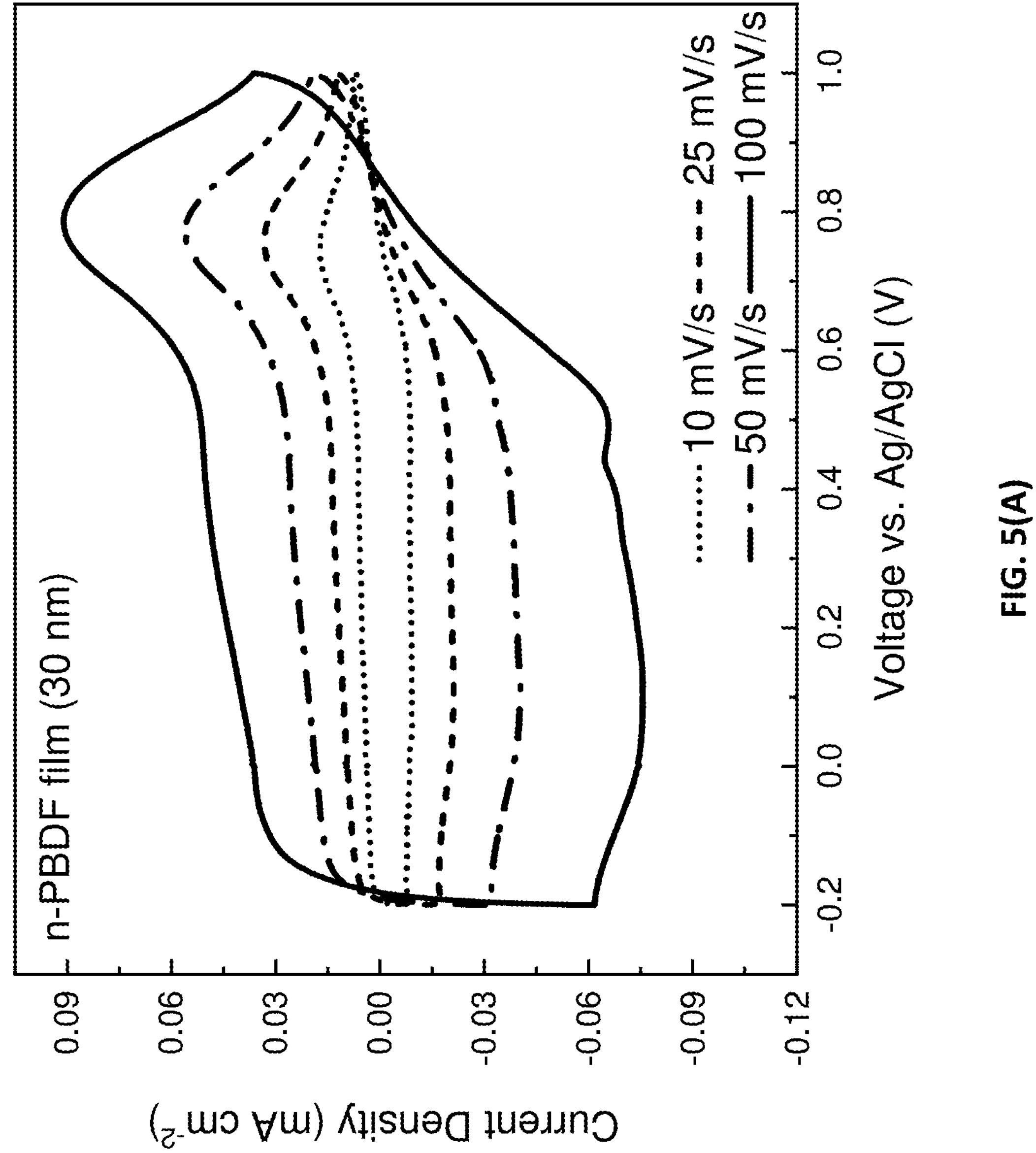
FIGS. 5(A)-(B) are diagrams illustrating charge capacity of an example n-doped organic conductive polymer n-PBDF.
Figure 5B:
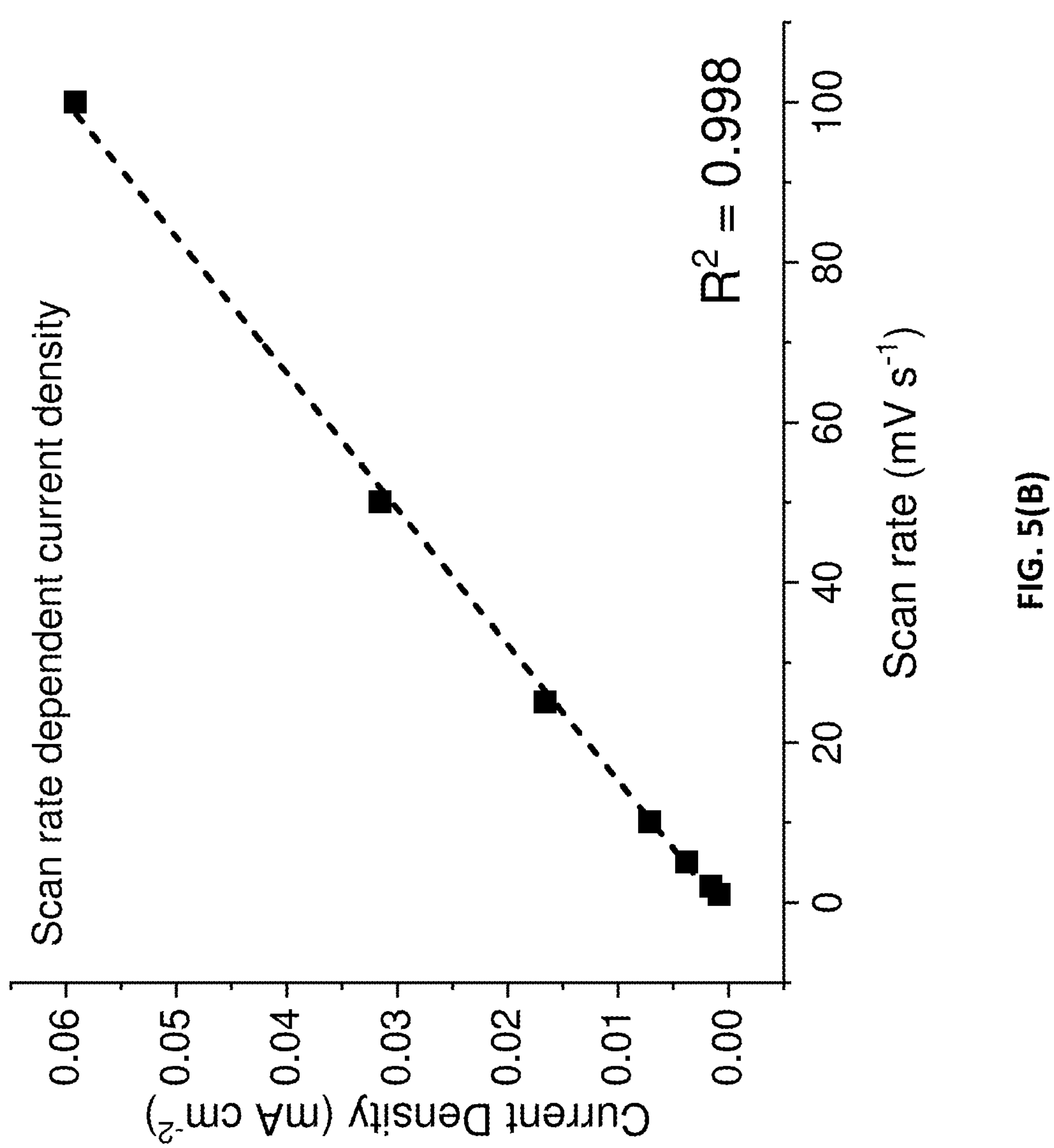

Besides transparency, the disclosed n-doped organic conductive polymer exhibits high charge density. The example n-doped organic conductive polymer n-PBDF is used for the demonstration. As shown in FIG. 5(A), the specific volumetric capacitance (C*) of an n-PBDF thin film was measured by recording cyclic voltammograms at different scan rates in 0.2 M TBA-TFSI (PC) electrolyte. According to the cyclic voltammograms, the non-zero current plateau in the −0.2 V to +0.4 V range represent double-layer capacitance. Capacitive behavior is also confirmed by the linear increase of the current density with the scan rate as shown in FIG. 5(B). Both high optical transmissivity and large charge capacity ensure the disclosed n-doped organic conductive polymer used in ion storage materials in ECD.

Figure 6:
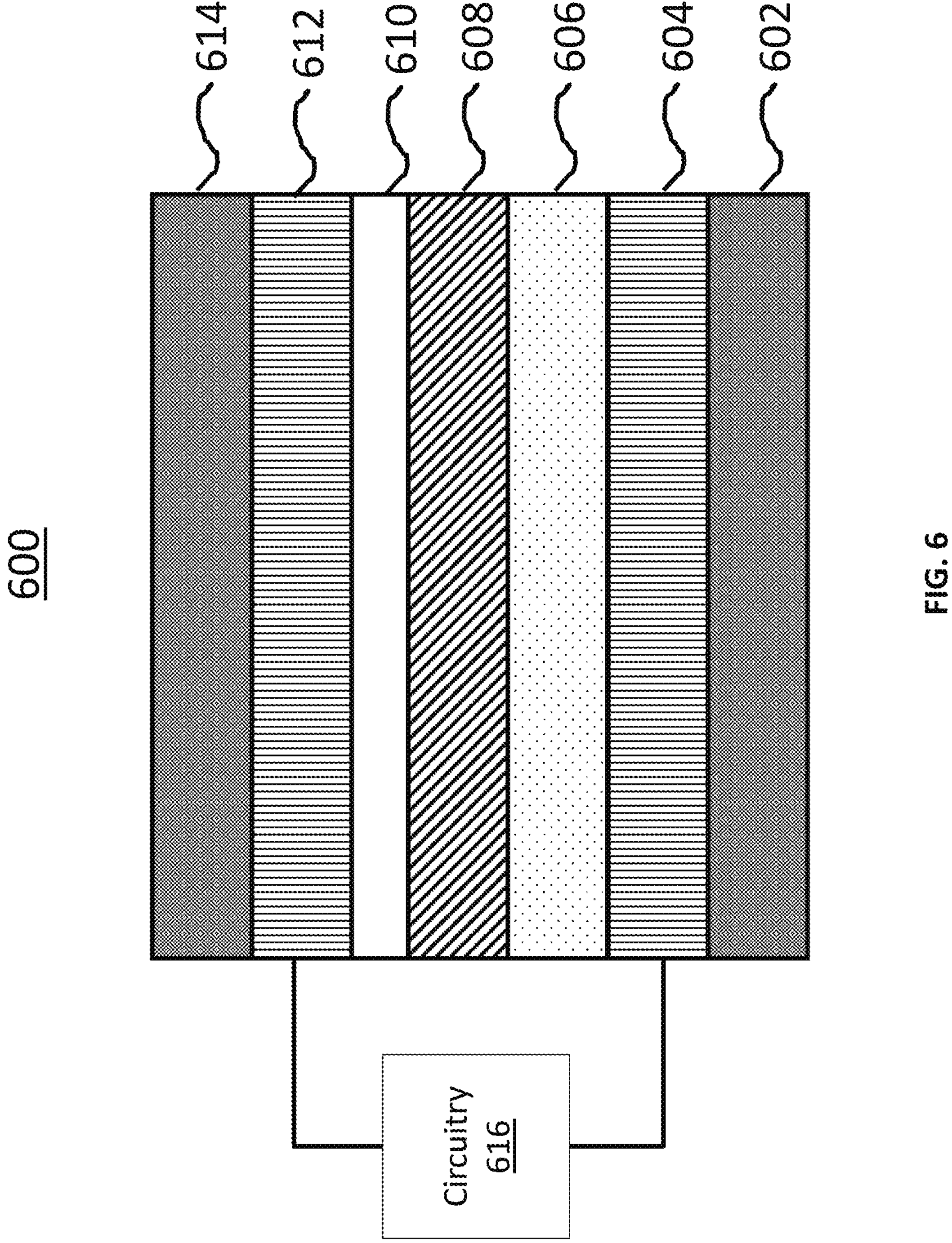
FIG. 6 is a cross-sectional view of an electrochromic device that includes a layer of the disclosed n-doped organic conductive polymer functioning as an ion storage layer, according to some example embodiments of the present disclosure.

The second type of the disclosed electrochromic device has a layer including the disclosed n-doped organic conductive polymer as an ion storage layer. An example ECD scheme with the layer including the disclosed n-doped organic conductive polymer functioning as an ion storage layer is shown in FIG. 6. The ECD includes a first insulating substrate 602, a first conducting layer 604 disposed over the first insulating substrate 602, an ion storage layer 606 including the disclosed n-doped organic conductive polymer disposed on the first conducting layer 604, an electrolyte layer 608 disposed over the ion storage layer 606 including the disclosed n-doped organic conductive polymer, an electrochromic layer 610 disposed over the electrolyte layer 608, a second conducting layer 612 disposed over the electrochromic layer 610, a second insulating substrate 614 disposed over the second conducting layer 612, and a circuitry 616 to operate the electrochromic device 600. The disclosed n-doped organic conductive polymer layer functions as an ion storage layer and can work with either inorganic or organic electrochromic materials in the electrochromic layer 610 (working electrode). In some embodiments, the ion storage layer 606 consists of the disclosed n-doped organic conductive polymer. In some embodiments, at least one of the first conducting layer or the second conducting layer is transparent. In some embodiments, both of the first conducting layer and the second conducting layer are transparent. In some embodiments, the first conducting layer or the second conducting layer comprises a reflective conducting layer, such as a metal layer, to form a reflective ECD.

Figure 7B:
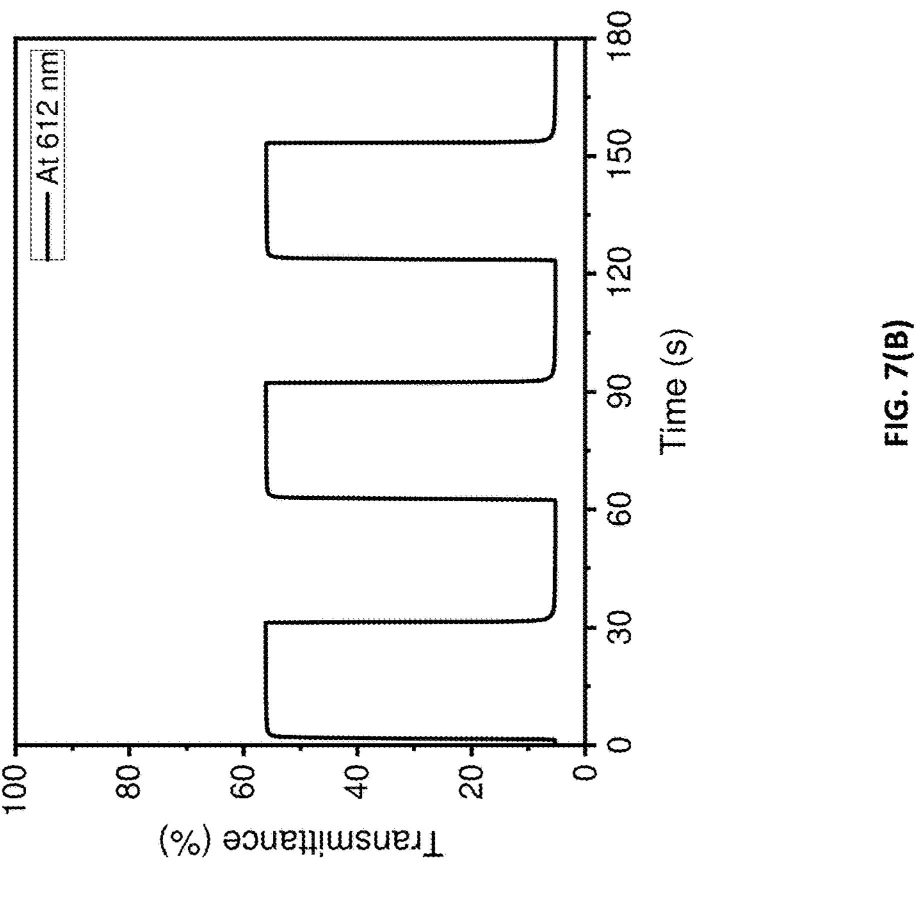
FIGS. 7(A)-(B) are diagrams of an example ITO/an example n-doped organic conductive polymer n-PBDF/ECP-B electrochromic device including a layer of n-PBDF functioning as the ion storage layer, according to one example embodiment.
Figure 7A:
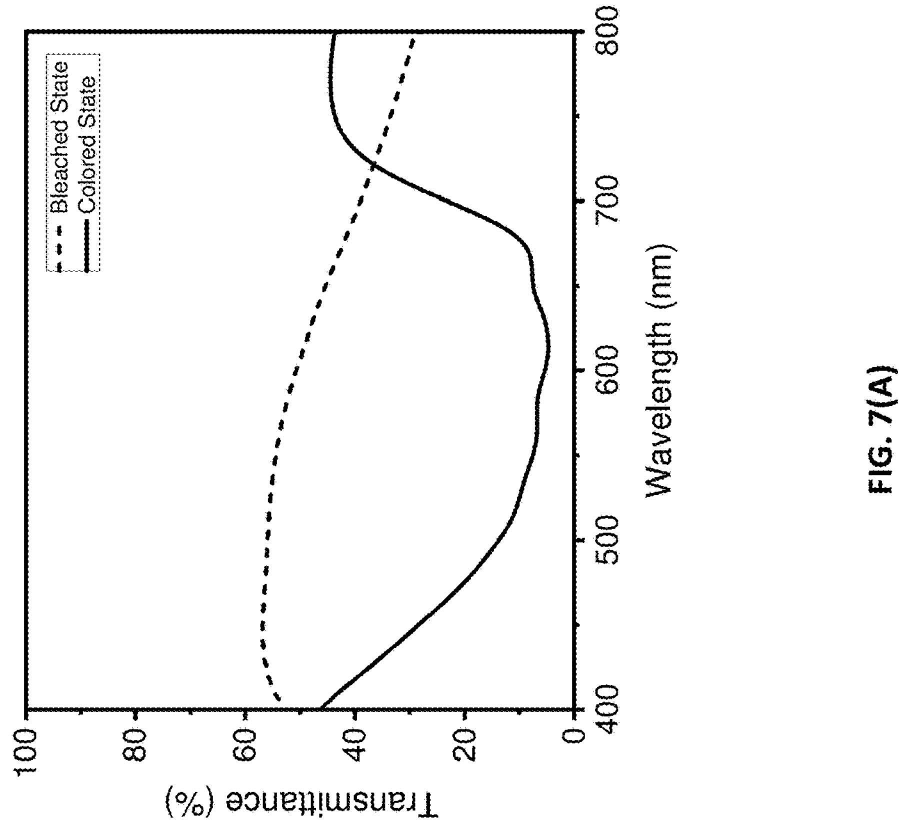

To demonstrate the performance of a layer including the disclosed n-doped organic conductive polymer as the ion storage layer (counter electrode) for the electrochromic device, ECP-B is used as an example ECP as the working electrode at the electrochromic layer and the example n-doped organic conductive polymer n-PBDF is used in the following ECD embodiment. In-situ crosslinked 1:1 PEGDA:0.2 M in PC is used as the electrolyte layer 608. The disclosed n-PBDF thin film is employed as the ion storage layer 606 for counter electrode. FIG. 7(A) is a diagram depicting the transmittance spectra of the disclosed electrochromic device. The transmittance spectra show great changes during the coloration process, indicating the successful switch of the electrochromic device between the colored state and the bleached state. The switching kinetics from stepwise potential fast chronoamperometry (SPFC) is shown in FIG. 7(B), which indicates that the electrochromic device achieves fast switching from 5% to 55% at 612 nm. The results demonstrate the disclosed n-doped organic conductive polymer works excellent as an ion storage material for the electrochromic device.

Figure 8:
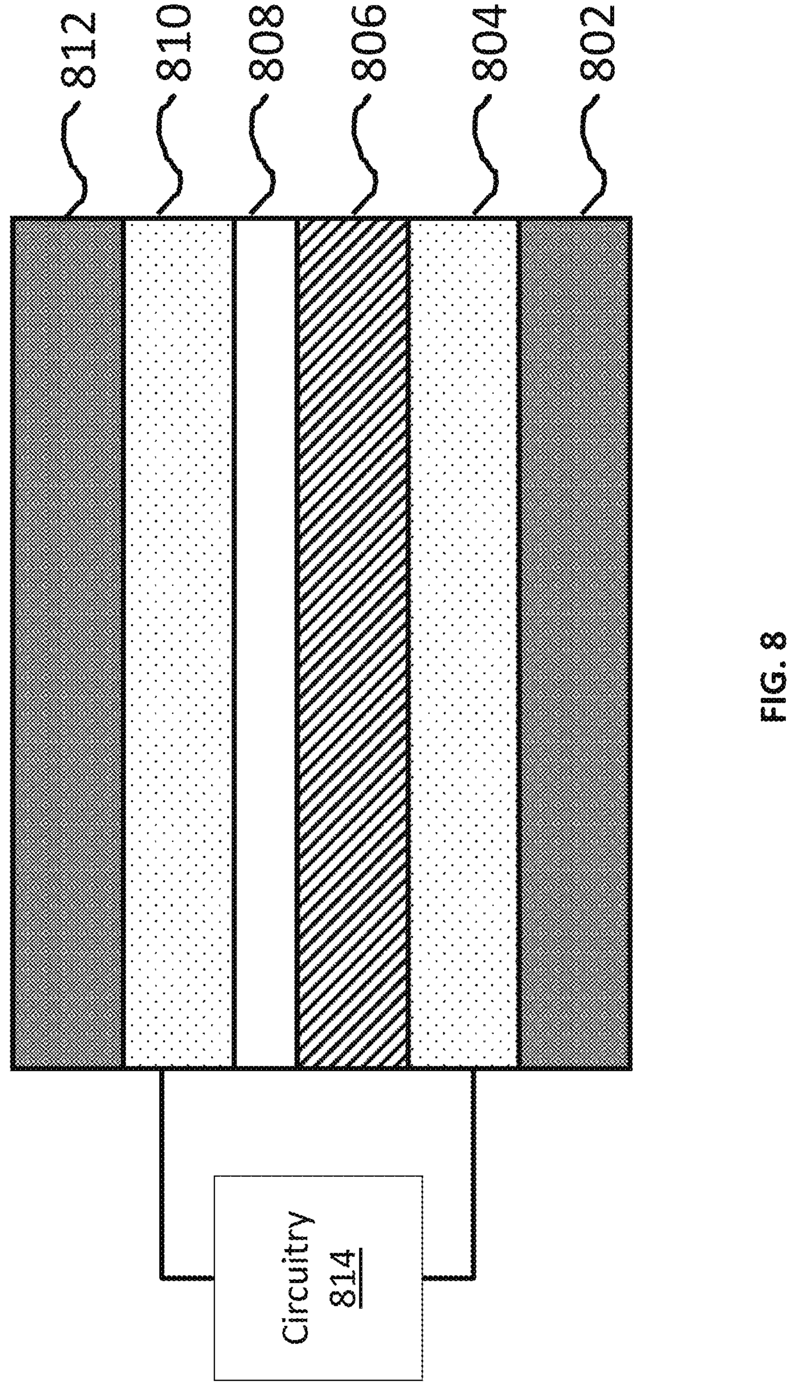
FIG. 8 is a cross-sectional view of an electrochromic device that includes a layer of the disclosed n-doped organic conductive polymer functioning as both an ion storage layer and a TC layer simultaneously for the counter electrode and another layer of the disclosed n-doped organic conductive polymer functioning as a TC layer for the working electrode, according to some example embodiments of the present disclosure.

The third type of the disclosed electrochromic device has a layer including the disclosed n-doped organic conductive polymer which functions as both a TC layer and an ion storage layer. One example configuration of electrochromic device 800 is shown in FIG. 8. The ECD 800 includes a first insulating substrate 802, a layer including the disclosed n-doped organic conductive polymer 804 disposed over the first insulating substrate 802, an electrolyte layer 806 disposed over the layer including the disclosed n-doped organic conductive polymer 804, an electrochromic layer 808 disposed over the electrolyte layer 806, a TC layer 810 disposed over the electrochromic layer 808, and a second insulating substrate 812 disposed over the conducting layer 810. The conducting layer 810 may include the disclosed n-doped organic conductive polymer or consist of the disclosed n-doped organic conductive polymer, or may be a TC layer without the disclosed n-doped organic conductive polymer, e.g., ITO, or may be a reflective conducting layer, e.g. a metal. The electrochromic device 800 further includes circuitry 814 to operate the electrochromic device 800. In this example device 800, the single layer 804 including the disclosed n-doped organic conductive polymer functions as both a TC layer for counter electrode and an ion storage layer simultaneously, thus simplifying the device structure with lower cost and higher throughput. In some embodiments, due to variations from other components in each layer, the layer including the disclosed n-doped organic conductive polymer 804 may be split into two separate layers with one layer including the disclosed n-doped organic conductive polymer functioning as a TC layer and the other layer including the disclosed n-doped organic conductive polymer functioning as an ion storage layer. The TC layer 810 may also include the disclosed n-doped organic conductive polymer or consist of the disclosed n-doped organic conductive polymer or may be a TC layer without the disclosed n-doped organic conductive polymer, e.g., ITO. In some embodiments, the layer 804 including the disclosed n-doped organic conductive polymer may be split into two separate layers with one layer including the disclosed n-doped organic conductive polymer as the ion storage layer and one TC layer without the disclosed n-doped organic conductive polymer, e.g. ITO, and the TC layer 810 may also include the disclosed n-doped organic conductive polymer or consist of the disclosed n-doped organic conductive polymer. In some embodiments, the disclosed electrochromic device has a layer consisting of the disclosed n-doped organic conductive polymer which functions as both a TC layer and an ion storage layer.

Figure 9B:
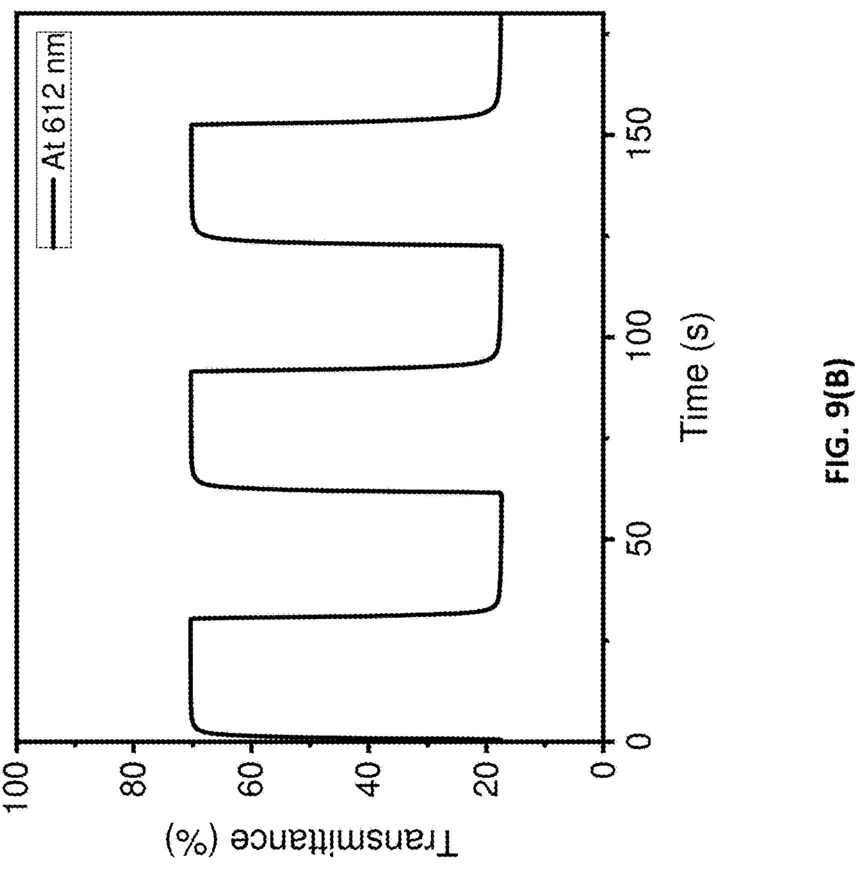
FIGS. 9(A)-(B) are diagrams of an example n-doped organic conductive polymer n-PBDF/ECP-B electrochromic device including a layer of n-PBDF functioning as both an ion storage layer and a TC layer simultaneously for the counter electrode and another layer of n-PBDF functioning as a TC layer for the working electrode, according to one example embodiment.
Figure 9A:
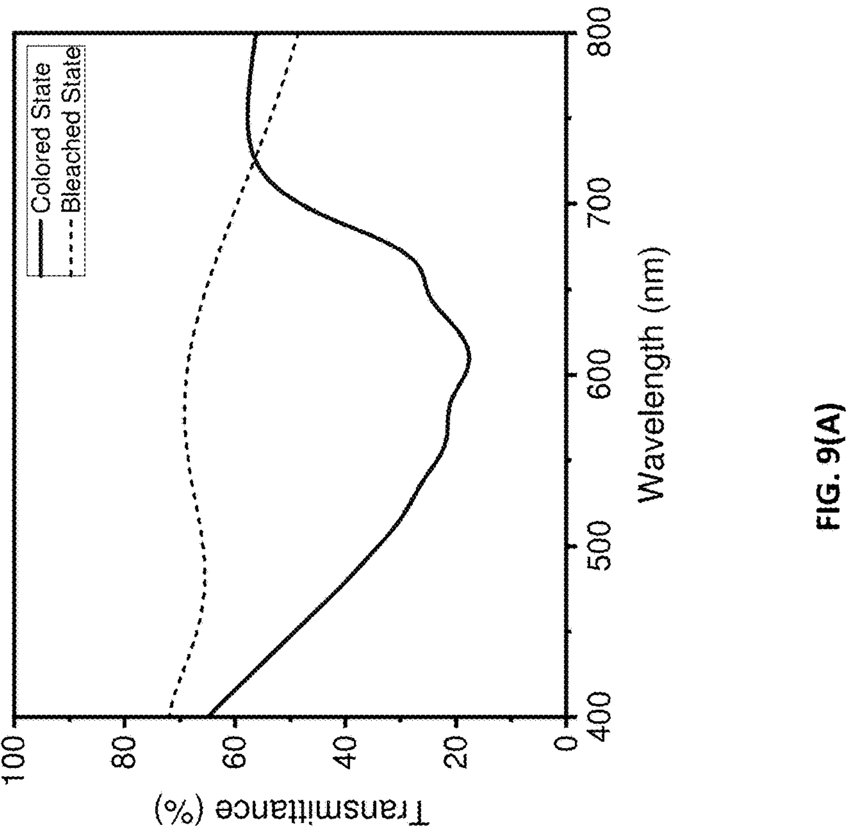

In one embodiment, the example n-doped organic conductive polymer n-PBDF is assembled into an electrochromic device using ECP-B as the electrochromic layer 808 (working electrode), in-situ crosslinked 1:1 PEGDA:0.2 M TBATFSI in PC as the electrolyte layer 806, the n-PBDF thin film as the transparent conducting layer 810 for the working electrode 808, and n-PBDF layer 804. The n-PBDF layer 804 functions as both a transparent conductor and an ion storage layer simultaneously for the counter electrode. The optical performances of the electrochromic device are illustrated in FIGS. 9(A) and 9(B). FIG. 9(A) is a diagram depicting the transmittance spectra of the electrochromic device. The transmittance spectra show great changes during the coloration process, indicating the successful switch of the electrochromic device between the colored state and the bleached state. The switching kinetics from stepwise potential fast SPFC is shown in FIG. 9(B), which indicates that the electrochromic device achieves fast switching from 18% to 70% at 612 nm. The results demonstrate the disclosed n-doped organic conductive polymer works excellent as a transparent conductor and an ion storage material for the counter electrode.

Figure 10B:
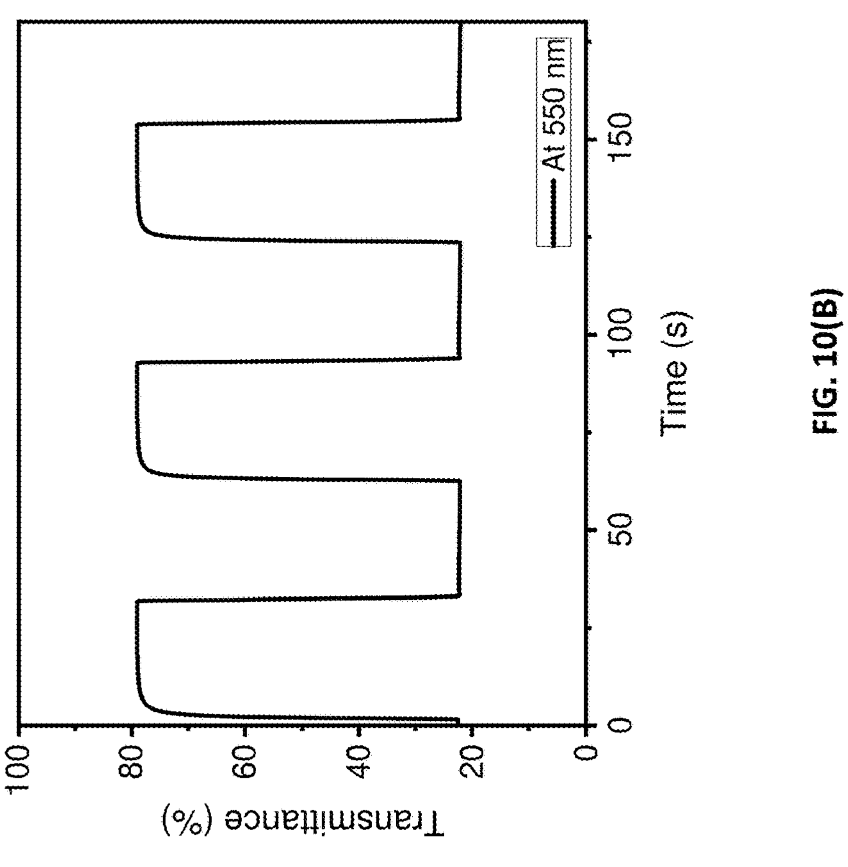
FIGS. 10(A)-(B) are diagrams of an example n-doped organic conductive polymer n-PBDF/ECP-M electrochromic device including a layer of n-PBDF functioning as both an ion storage layer and a TC layer simultaneously for the counter electrode and another layer of n-PBDF functioning as a TC layer for the working electrode, according to one example embodiment.
Figure 10A:
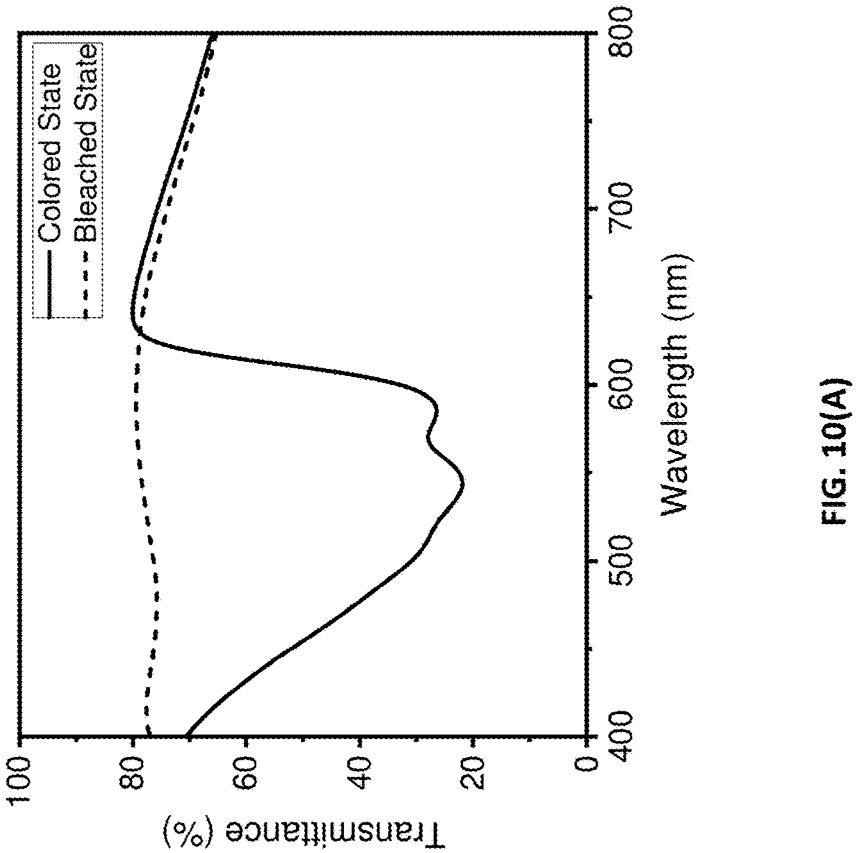

The above structural configuration can be also applied to other types of ECP. For example, the ECP-B of the electrochromic layer 808 may be replaced with ECP-M or ECP-BK. The optical performances of the electrochromic device having ECP-M electrochromic layer 808 are illustrated in FIGS. 10(A) and 10(B). FIG. 10(A) is a diagram depicting the transmittance spectra of the electrochromic device. The transmittance spectra show great changes during the coloration process, indicating the successful switch of the electrochromic device between the colored state and the bleached state. The switching kinetics from stepwise potential fast SPFC is shown in FIG. 10(B), which indicates that the electrochromic device achieves fast switching from 22% to 78% at 550 nm. The results demonstrate the disclosed n-doped organic conductive polymer works excellent as a transparent conductor and an ion storage material with ECP-M electrochromic layer 808.

Figure 11B:
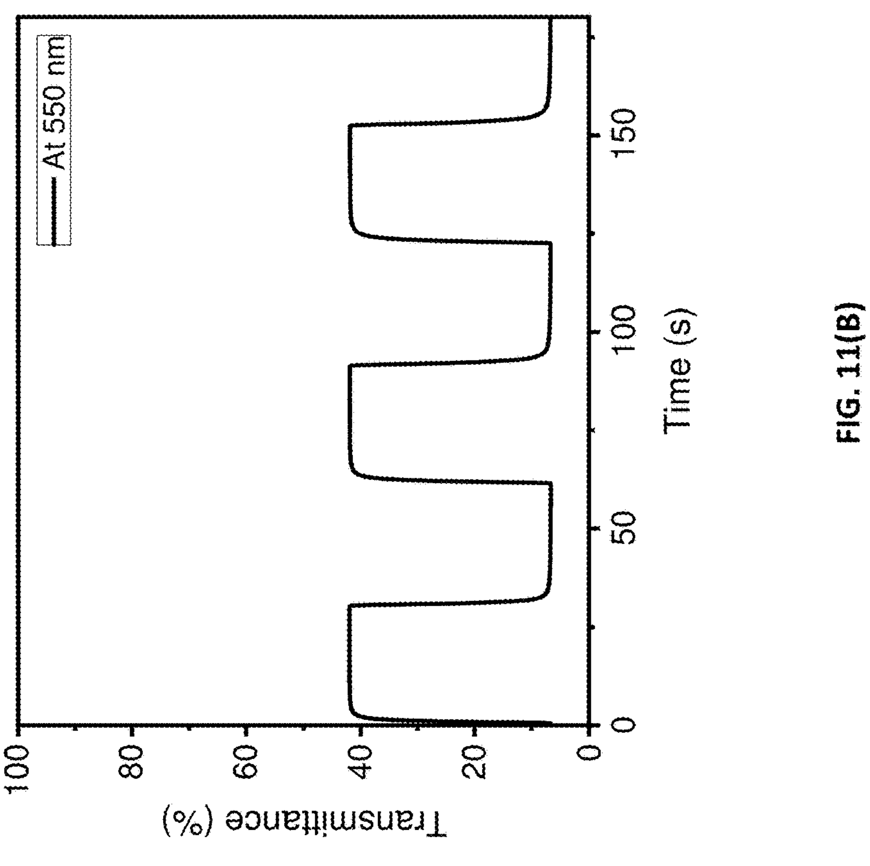
FIGS. 11(A)-(B) are diagrams of an example n-doped organic conductive polymer n-PBDF/ECP-BK electrochromic device including a layer of n-PBDF functioning as both an ion storage layer and a TC layer simultaneously for the counter electrode and another layer of n-PBDF functioning as a TC layer for the working electrode, according to one example embodiment.
Figure 11A:
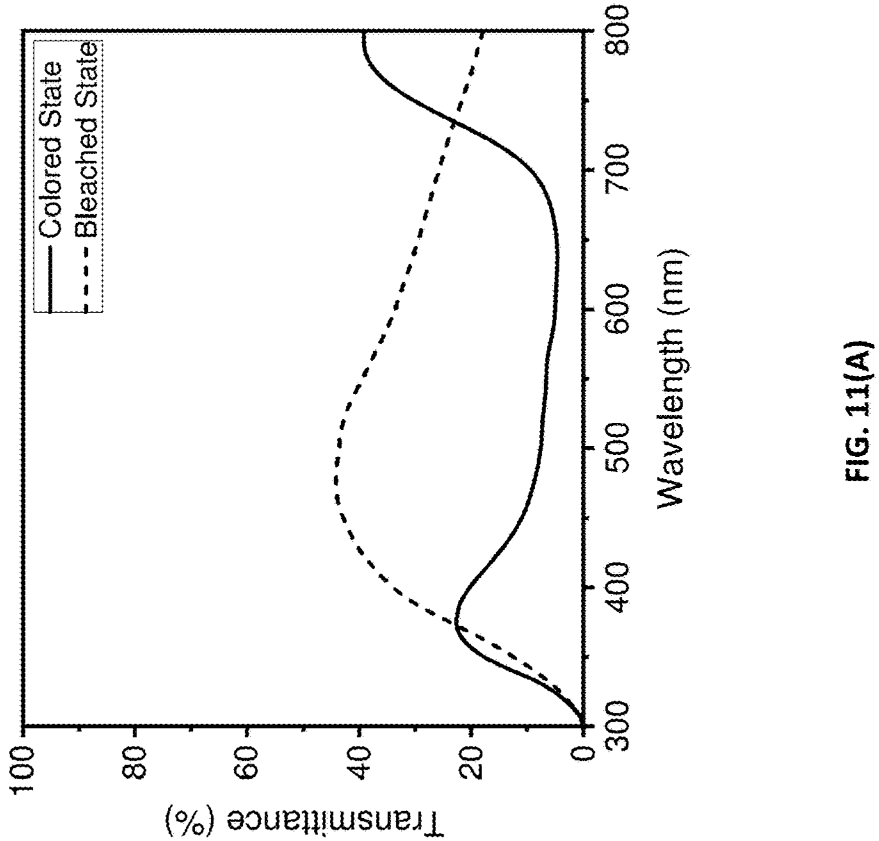

The optical performances of the electrochromic device having ECP-BK electrochromic layer 808 are illustrated in FIGS. 11(A) and 11(B). FIG. 11(A) is a diagram depicting the transmittance spectra of the electrochromic device. The transmittance spectra show great changes during the coloration process, indicating the successful switch of the electrochromic device between the colored state and the bleached state. The switching kinetics from stepwise potential fast SPFC is shown in FIG. 11(B), which indicates that the electrochromic device achieves fast switching from 7% to 40% at 550 nm. The results demonstrate the disclosed n-doped organic conductive polymer also works excellent as a transparent conductor and/or ion storage material with ECP-BK electrochromic layer 808.

Both inorganic and organic electrochromic materials may be used in the electrochromic layer in the electrochromic device disclosed herein. In some embodiments, the electrochromic layer in the electrochromic device disclosed herein includes one or more of $WO_3$, NiO, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. Different types of electrolyte materials (e.g., liquid electrolyte, gel electrolyte, or solid electrolyte) may be used in the electrolyte layer in the electrochromic device disclosed herein. In some embodiments, the electrolyte layer in the electrochromic device disclosed herein includes a solid electrolyte or a gel electrolyte.

Both inorganic and organic ion storage materials may be used in the ion storage layer in the electrochromic device disclosed herein. In some embodiments, when the ion storage layer does not include the disclosed n-doped organic conductive polymer, the ion storage layer in the electrochromic device disclosed herein includes one or more oxides of metal elements in Group 4-12, or a mixture of the oxides, or one of the oxides doped by any other metal oxides. The substrates 102 and 114 may be any insulating substrate, such as glass or plastic. The substrates 102 and 114 may be flexible to adapt in roll-to-roll manufacturing processes.

Figure 12:
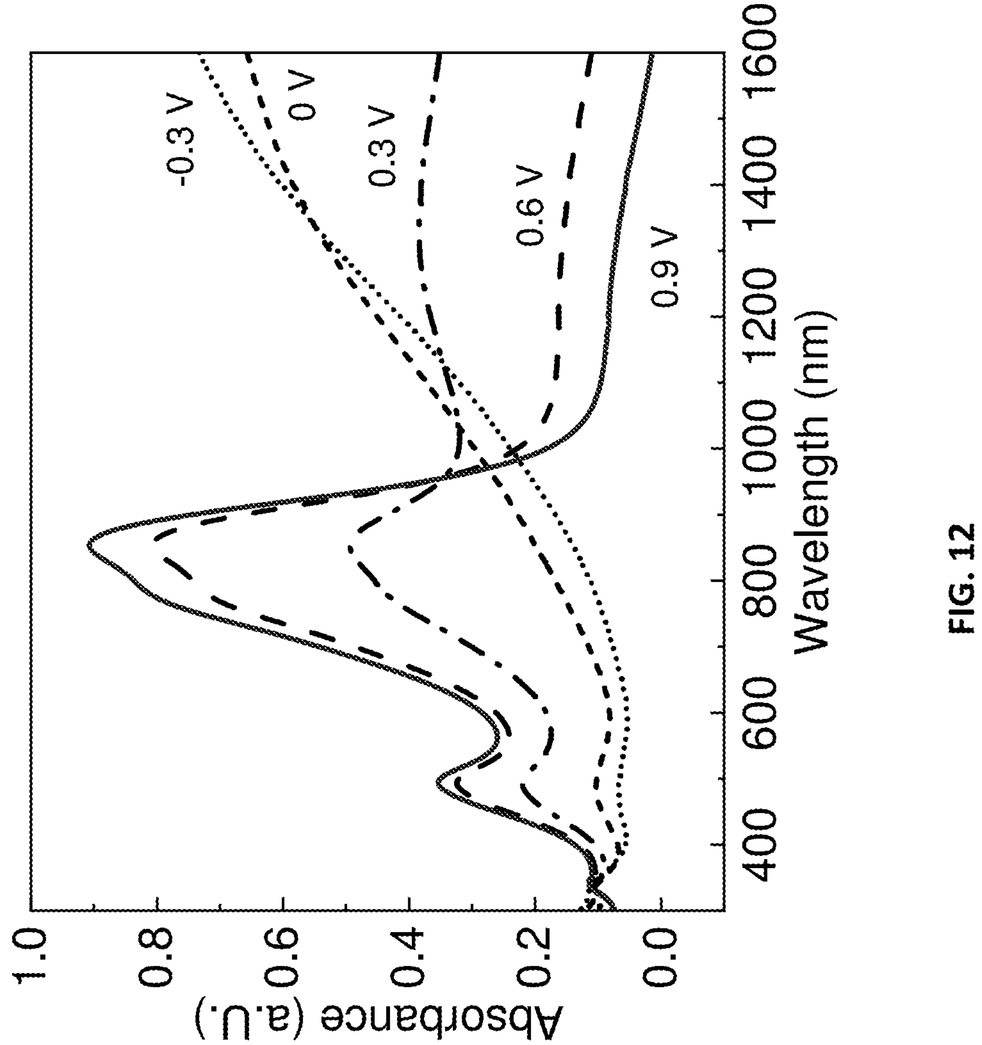
FIG. 12 is absorbances spectroelectrochemistry of an example n-doped organic conductive polymer n-PBDF in 0.2M TBA-TFSI in PC with the applied voltage increased from −0.3V to 0.9V.
Figure 13:
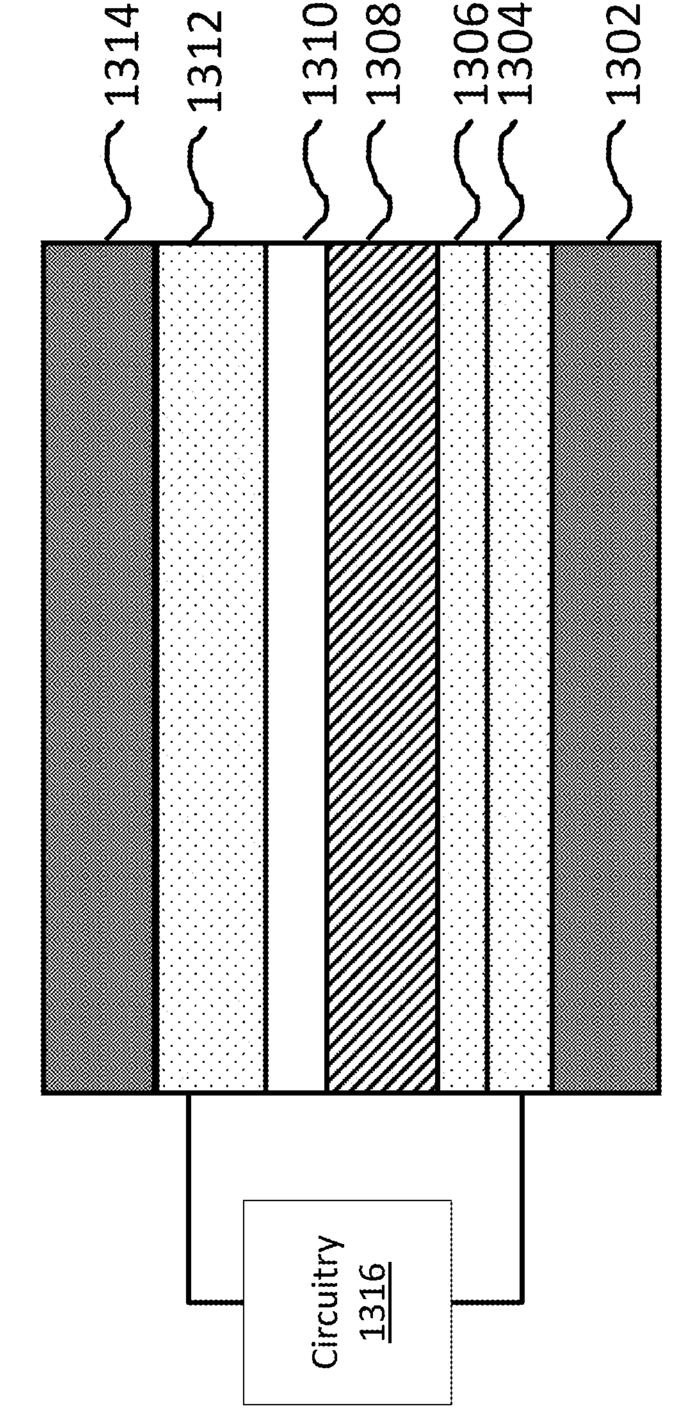
FIG. 13 is a cross-sectional view of an electrochromic device that includes a layer of an disclosed n-doped organic conductive polymer functioning as an electrochromic layer for the counter electrode, according to one example embodiment.

In another aspect, the present disclosure is also related to the use of the disclosed n-doped organic conductive polymer as an electrochromic layer. The example organic conductive polymer PBDF and the example n-doped organic conductive polymer n-PBDF are a redox couple. Thus, they can potentially function as an electrochromic material. The spectroelectrochemical characterization of the example n-doped organic conductive polymer n-PBDF in 0.2M TBA-TFSI in PC is performed. As shown in FIG. 12, n-PBDF can conduct a redox reaction and presents a color with a maximum absorbance at around 850 nm and the absorbance increases with the increasing applied voltages. FIG. 13 depicts a configuration of an electrochromic device 1300 that employs the disclosed n-doped organic conductive polymer as an electrochromic material for the counter electrode, according to one example embodiment. The electrochromic device 1300 includes a first insulating substrate 1302, a first conducting layer 1304 disposed over the first insulating substrate 1302, a first electrochromic layer 1306 including the disclosed n-doped organic conductive polymer disposed over the first conducting layer 1304, an electrolyte layer 1308 disposed over the first electrochromic layer 1306 including the disclosed n-doped organic conductive polymer, a second electrochromic layer 1310 including a p-doped electrochromic material disposed over the electrolyte layer 1308, a second conducting layer 1312 disposed over the second electrochromic layer 1310 including the p-doped electrochromic material, and a second insulating substrate 1314 disposed over the second conducting layer 1312. In some embodiments, one of the first or the second conducting layers 1304 and 1312 may include an organic or inorganic conductive material (such as ITO). In some embodiments, one of the first and the second conducting layers includes a reflective conducting material, such as metal, to form a reflective ECD. In some embodiments, at least one of the first conducting layer or the second conducting layer is transparent. In some embodiments, both of the first conducting layer and the second conducting layer are transparent. In some embodiments, the first and the second conducting layers 1304 and 1312 do not include the disclosed n-doped organic conductive polymer since under the applied voltage window for such a dual-polymer ECD as illustrated here, the disclosed n-doped organic conductive polymer may be colored. the disclosed n-doped organic conductive polymer in the first electrochromic layer 1306 functions as an n-doped ECP. The electrochromic device 1300 further includes circuitry 1316 to operate the electrochromic device 1300. In some embodiment, the first electrochromic layer 1306 consists of the disclosed n-doped organic conductive polymer.

Both inorganic and organic p-doped electrochromic materials may be used in the second electrochromic layer 1310. In some embodiments, the p-doped electrochromic materials in the second electrochromic layer 1310 includes one or more of NiO, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. In some embodiments, the p-doped electrochromic material is a p-doped electrochromic polymer. Different types of electrolyte materials (e.g., liquid electrolyte, gel electrolyte, or solid electrolyte) may be used in the electrolyte layer 1308 in the electrochromic device disclosed herein. In some embodiments, the electrolyte layer 1308 in the electrochromic device disclosed herein includes a solid electrolyte or a gel electrolyte.

Figure 14A:
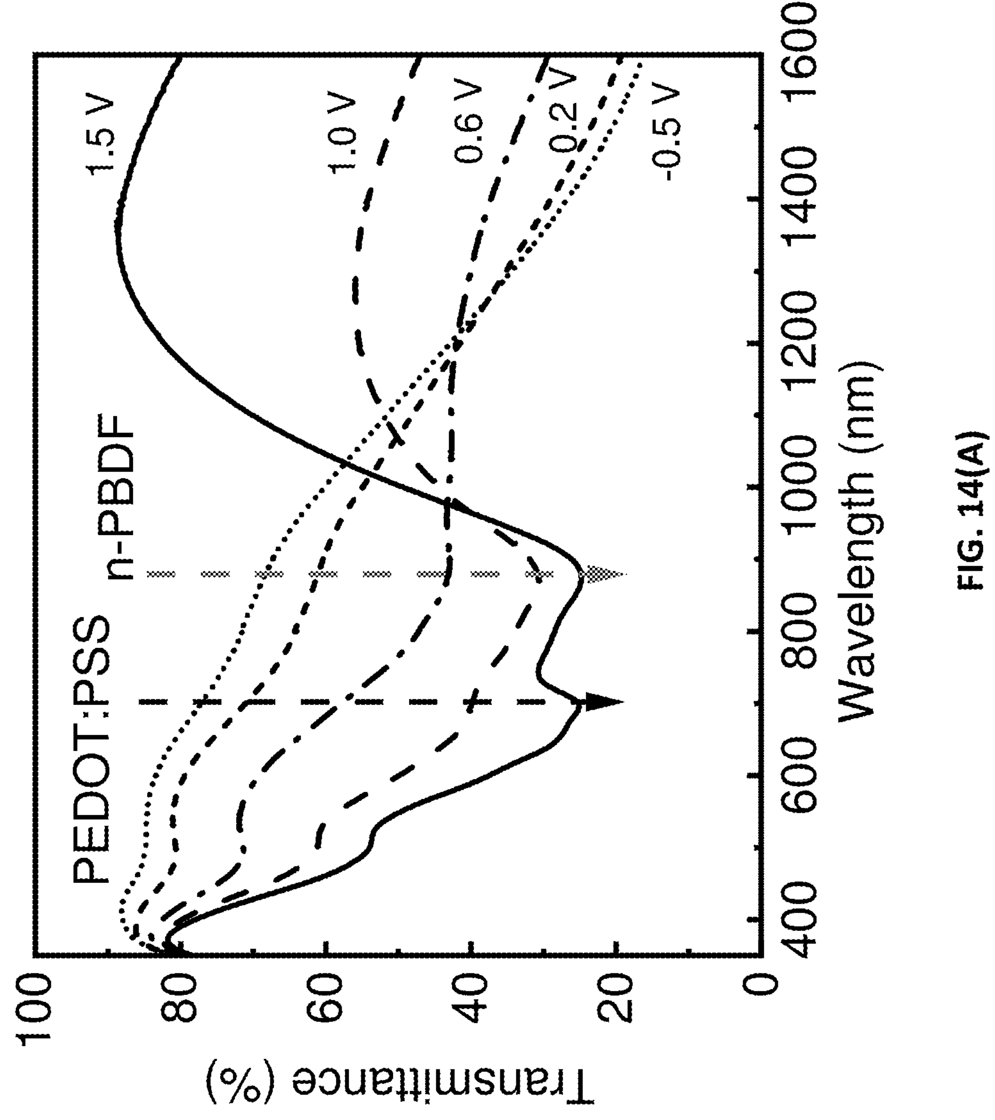
FIGS. 14(A)-(B) contain diagrams of an example an example n-doped organic conductive polymer n-PBDF/PEDOT:PSS electrochromic device including a layer of n-PBDF functioning as an electrochromic layer for the counter electrode, according to one example embodiment.
Figure 14B:
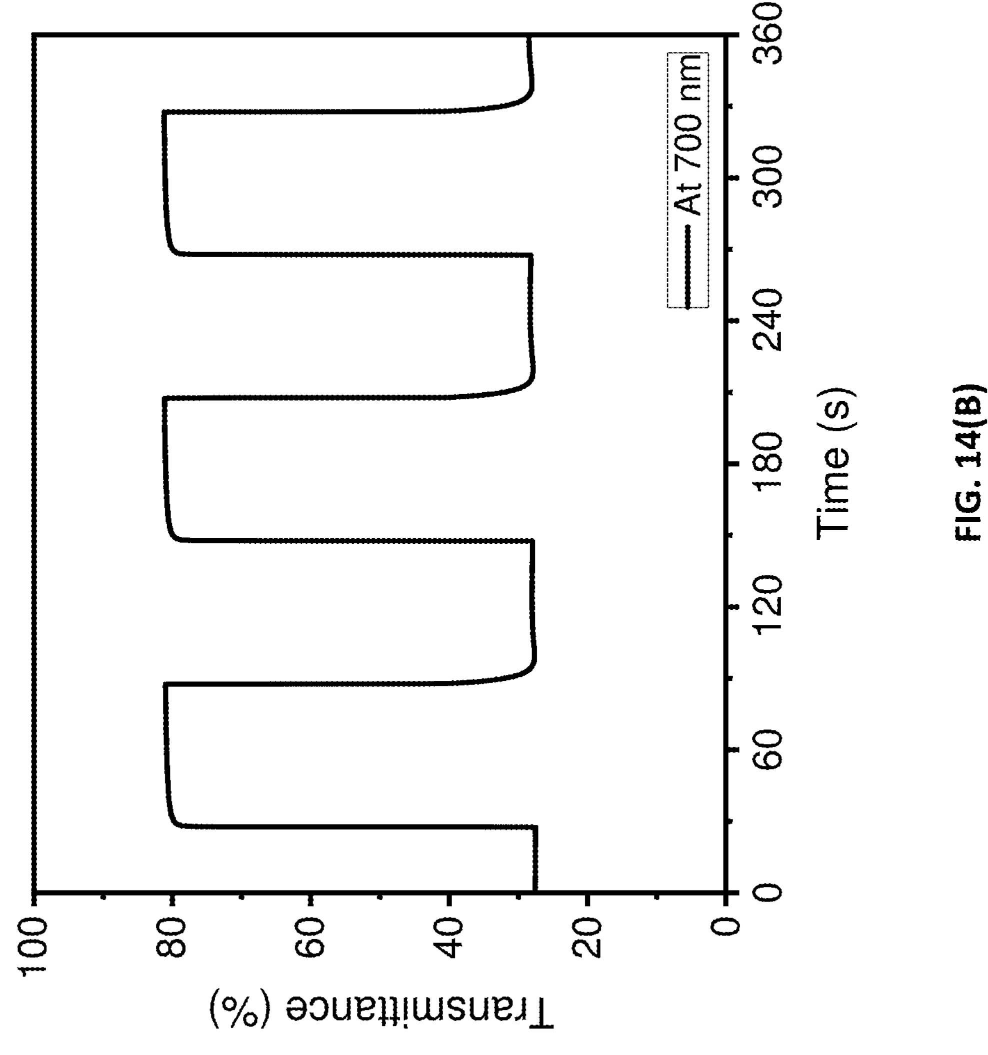

To demonstrate the performance of the disclosed n-doped organic conductive polymer as an EC layer, the example n-doped organic conductive polymer n-PBDF, is paired with PEDOT:PSS, an example p-doped polymer, to make a dual-polymer electrochromic device. In one embodiment, the n-PBDF is assembled into an electrochromic device using PEDOT:PSS as the p-doped ECP, in-situ crosslinked 1:1 PEGDA:0.2 M TBATFSI in PC as the electrolyte, the n-PBDF as the n-doped ECP. The schematic is drawn in FIG. 13. Spectroelectrochemical measurements were recorded between −0.5 V and 1.5 V with an increment of 0.2 V, as seen in FIG. 14(A) (only a few voltages were shown as an example). On the one electrode, n-PBDF loses electrons upon oxidation and returns to the neutral state, accompanied by the rise of an absorbance peak around 850 nm. On the other electrode, PEDOT:PSS is reduced and returns to the neutral state, accompanied by the rise of an absorbance peak around 700 nm. The electrochromic device shows fast-switching kinetics and a high optical contrast of 50%. It reaches bleached state within 0.2 s at the applied voltage of −0.5 V and becomes colored within 3 s at the applied voltage of 1.5 V as shown in FIG. 14(B). This device shows a high coloration efficiency of 1900 $cm^2/C$, which is the highest recorded number among known electrochromic devices.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. An electrochromic device, comprising:

a first insulating substrate;

a first conducting layer disposed over the first insulating substrate;

an ion storage layer disposed over the first conducting layer;

an electrolyte layer disposed over the ion storage layer;

an electrochromic layer disposed over the electrolyte layer;

a second conducting layer disposed over the electrochromic layer; and a second insulating substrate disposed over the second conducting layer;

wherein the first conducting layer or the second conducting layer or the ion storage layer, or any combination of the first conducting layer, the second conducting layer, and the ion storage layer, comprises an n-doped organic conductive polymer with a formula of

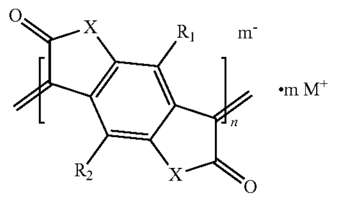

wherein X is O, S, or Se; each of m and n is an integer greater than zero; each of $R_1$ and $R_2$ is independently selected from one of hydrogen or $C_1$-$C_{10}$ alkyl; $M^+$ is a cation, and $m^-$ is negative charges that balance $mM^+$.

2. The electrochromic device of claim 1, wherein X is O, each of $R_1$ and $R_2$ is hydrogen, and $M^+$ is a proton.

3. The electrochromic device of claim 1, wherein the first conducting layer or the second conducting layer or the ion storage layer or any combination of the first conducting layer, the second conducting layer, and the ion storage layer, consists of the n-doped organic conductive polymer.

4. The electrochromic device of claim 1, wherein both the first conducting layer and the ion storage layer comprise the n-doped organic conductive polymer and are integrated into one single layer.

5. The electrochromic device of claim 1, wherein the electrochromic layer includes one or more of $WO_3$, NiO, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles.

6. The electrochromic device of claim 1, wherein the electrolyte layer comprises a solid electrolyte or a gel electrolyte.

7. The electrochromic device of claim 1, wherein when the ion storage layer does not include the n-doped organic conductive polymer, the ion storage layer includes one or more oxides of metal elements in Group 4-12, or a mixture of the oxides, or one of the oxides doped by any other metal oxides.

8. The electrochromic device of claim 1, wherein at least one of the first conducting layer or the second conducting layer is transparent.

9. The electrochromic device of claim 1, wherein both of the first conducting layer and the second conducting layer are transparent.

10. The electrochromic device of claim 1, wherein the first conducting layer or the second conducting layer comprises a reflective conducting layer.

11. An electrochromic device, comprising:

a first insulating substrate;

a first conducting layer disposed over the first insulating substrate;

a first electrochromic layer disposed over the first conducting layer and comprising an n-doped organic conductive polymer with a formula of

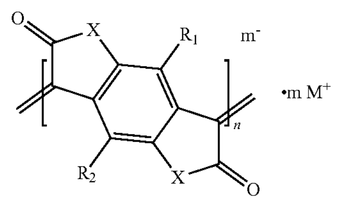

wherein X is O, S, or Se; each of m and n is an integer greater than zero; each of $R_1$ and $R_2$ is independently selected from one of hydrogen or $C_1$-$C_{10}$ alkyl; $M^+$ is a cation, and $m^-$ is negative charges that balance $mM^+$;

an electrolyte layer disposed over the first electrochromic layer;

a second electrochromic layer disposed over the electrolyte layer comprising a p-doped electrochromic material;

a second conducting layer disposed over the second electrochromic layer; and a second insulating substrate disposed over the second conducting layer.

12. The electrochromic device of claim 11, wherein X is O, each of $R_1$ and $R_2$ is hydrogen, and $M^+$ is a proton.

13. The electrochromic device of claim 11, wherein the first electrochromic layer disposed over the first conducting layer consists of the n-doped organic conductive polymer.

14. The electrochromic device of claim 11, wherein the p-doped electrochromic material includes one or more of NiO, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles.

15. The electrochromic device of claim 11, wherein the p-doped electrochromic material is a p-doped electrochromic polymer.

16. The electrochromic device of claim 11, wherein the electrolyte layer comprises a solid electrolyte or a gel electrolyte.

17. The electrochromic device of claim 11, wherein one of the first or the second conducting layer comprises an inorganic conductive material.

18. The electrochromic device of claim 17, wherein the inorganic conductive material comprises indium tin oxide or a metal.

19. The electrochromic device of claim 11, wherein at least one of the first conducting layer or the second conducting layer is transparent.

20. The electrochromic device of claim 11, wherein the first conducting layer or the second conducting layer comprises a reflective conducting layer.

* * * * *